United States Patent
Lee et al.

(10) Patent No.: US 12,523,335 B2
(45) Date of Patent: Jan. 13, 2026

(54) DISPLAY APPARATUS

(71) Applicant: SAMSUNG ELECTRONICS CO., LTD., Suwon-si (KR)

(72) Inventors: Sanggoo Lee, Suwon-si (KR); Sunggi Kim, Suwon-si (KR); Bongjoo Kim, Suwon-si (KR); Seunggu Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/625,859

(22) Filed: Apr. 3, 2024

(65) Prior Publication Data

US 2024/0401737 A1    Dec. 5, 2024

Related U.S. Application Data

(63) Continuation of application No. PCT/KR2024/002797, filed on Mar. 5, 2024.

(30) Foreign Application Priority Data

Jun. 2, 2023   (KR) .......................... 10-2023-0071941

(51) Int. Cl.
*F16M 11/08* (2006.01)
*F16M 11/04* (2006.01)
*F16M 11/12* (2006.01)

(52) U.S. Cl.
CPC ......... *F16M 11/125* (2013.01); *F16M 11/046* (2013.01); *F16M 2200/06* (2013.01)

(58) Field of Classification Search
CPC ............... F16M 11/125; F16M 11/046; F16M 2200/06; F16M 11/105; F16M 11/04; F16M 11/18; F16M 11/2021; F16M 11/24
See application file for complete search history.

(56) References Cited

U.S. PATENT DOCUMENTS 7,213,792 B2   5/2007  Choi
7,336,478 B2   2/2008  Jang
(Continued)

FOREIGN PATENT DOCUMENTS

CN     101504870 A    8/2009
CN     201487494 U    5/2010
(Continued)

OTHER PUBLICATIONS

International Search Report dated Jun. 21, 2024 for International Application No. PCT/KR2024/002797.
(Continued)

*Primary Examiner* — Amy J. Sterling
(74) *Attorney, Agent, or Firm* — STAAS & HALSEY LLP

(57) ABSTRACT

A display apparatus including a display; a support arm coupled to a rear of the display to support the display such that the display is rotatable with respect to the support arm, and including a link member configured to move forward and rearward based on the display being rotated with respect to the support arm; and a support stand configured to support the support arm such that the support arm is movable along a vertical direction, and including a cylinder operable to provide a driving force to move the support arm upward along the vertical direction, wherein, when the display is rotated with respect to the support arm, the link member moves rearward, which thereby causes the cylinder to be operated to provide the driving force to move the support arm upward along the vertical direction, and thereby move the display upward along the vertical direction.

14 Claims, 17 Drawing Sheets

(56) References Cited

U.S. PATENT DOCUMENTS

| | | | |
|---|---|---|---|
| 7,448,580 B2 | 11/2008 | Shimizu et al. | |
| 7,490,796 B2 * | 2/2009 | Kim | F16M 11/105 |
| | | | 248/292.12 |
| 7,643,276 B2 | 1/2010 | Shin | |
| 8,659,884 B2 * | 2/2014 | Segar | F16M 11/22 |
| | | | 361/679.22 |
| 12,297,954 B2 * | 5/2025 | Do | F16M 11/105 |
| 2023/0333589 A1 | 10/2023 | Lee et al. | |
| 2024/0084956 A1 | 3/2024 | Lee et al. | |

FOREIGN PATENT DOCUMENTS

| | | |
|---|---|---|
| CN | 203363576 U | 12/2013 |
| JP | 2011-17738 | 1/2011 |
| JP | 2016-40866 | 3/2016 |
| KR | 10-0534120 | 12/2005 |
| KR | 10-2006-0016664 | 2/2006 |
| KR | 10-0653286 | 12/2006 |
| KR | 10-2011-0109038 | 10/2011 |
| KR | 10-1164820 | 7/2012 |
| KR | 10-2020-0120253 | 10/2020 |
| KR | 10-2535143 | 5/2023 |
| KR | 10-2023-0113225 | 7/2023 |
| WO | WO 2023/204391 A1 | 10/2023 |
| WO | WO 2024/053815 A1 | 3/2024 |

OTHER PUBLICATIONS

Written Opinion of the International Searching Authority dated Jun. 21, 2024 for International Application No. PCT/KR2024/002797.

* cited by examiner

DISPLAY APPARATUS

CROSS-REFERENCE TO RELATED APPLICATIONS

This application is a continuation application, under 35 U.S.C. § 111(a), of International Application No. PCT/KR2024/002797, filed on Mar. 5, 2024, which claims priority under 35 U.S.C. § 119 to Korean Patent Application 10-2023-0071941, filed on Jun. 2, 2023, in the Korean Intellectual Property Office, the disclosures of which are incorporated by reference herein in their entireties.

TECHNICAL FIELD

The present disclosure relates to a display apparatus including a display and a support device capable of supporting the display to allow the display to be rotated and moved up and down.

BACKGROUND ART

A display apparatus is a type of output device that converts obtained or stored electrical information into visual information and displays the converted visual information to a user.

The display apparatus may include a display for displaying an image and a support device for supporting the display. The support device may be provided to support the display such that a front surface of the display on which an image is displayed may face the user.

The support device may support the display such that the display may move up and down within a predetermined range. The support device may support the display such that the display may enable pivot rotation. The pivot rotation may refer to an operation in which the display is rotated around a predetermined axis extending along a front-rear direction.

When the display performs the pivot rotation in a state of being not sufficiently spaced from a floor surface, the display may collide with the floor surface and be damaged.

DISCLOSURE

Technical Problem

The present disclosure is directed to providing a display apparatus capable of preventing a display from colliding with a floor surface during performing pivot rotation of the display.

The present disclosure is directed to providing a display apparatus in which a support device automatically moves a display upward when pivot rotation of the display is performed at a predetermined angle.

Technical tasks to be achieved in this document are not limited to the technical tasks mentioned above, and other technical tasks not mentioned will be clearly understood by those skilled in the art from the description below.

Technical Solution

Aspects of embodiments of the disclosure will be set forth in part in the description which follows and, in part, will be apparent from the description, or may be learned by practice of the presented embodiments.

According to an embodiment of the disclosure, a display apparatus includes a display; a support arm coupled to a rear of the display to support the display such that the display is rotatable with respect to the support arm, and including a link member configured to move forward and rearward based on the display being rotated with respect to the support arm; and a support stand configured to support the support arm such that the support arm is movable along a vertical direction, and including a cylinder operable to provide a driving force to move the support arm upward along the vertical direction, wherein, when the display is rotated with respect to the support arm so that the link member moves rearward, the cylinder is thereby operated to provide the driving force to move the support arm upward along the vertical direction so that the display moves upward along the vertical direction.

According to an embodiment of the disclosure, the display may be rotatable with respect to the support arm so as to be positioned in any one of a first orientation in which a long side of the display is disposed horizontally and a second orientation in which the long side is disposed vertically.

According to an embodiment of the disclosure, the display may be rotatable with respect to the support arm in a first direction, and a second direction opposite to the first direction, to be rotated from the first orientation to the second orientation, and from the second orientation to the first orientation.

According to an embodiment of the disclosure, the display may be rotatable from the first orientation to the second orientation by being rotated in the first direction or the second direction at a first angle with respect to the support arm. The display may be rotatable from the second orientation to the first orientation by being rotated in the first direction or the second direction at the first angle with respect to the support arm. The support stand may be configured so that the cylinder is operable to move the support arm upward along the vertical direction, and thereby move the display upward along the vertical direction, based on the display being rotated in the first direction or the second direction at a second angle with respect to the support arm, the second angle being smaller than the first angle.

According to an embodiment of the disclosure, the display may include a plurality of guide grooves on a rear surface of the display, each guide groove among the plurality of guide grooves extending longitudinally in an arc shape. A depth of each guide groove among the plurality of guide grooves may vary along a circumferential direction of the arc shape.

According to an embodiment of the disclosure, the support arm may include an elastic member elastically biasing the link member forward so that the link member is insertable into a corresponding guide groove among the plurality of guide grooves.

According to an embodiment of the disclosure, the support stand may include a link bracket configured to move upward along the vertical direction based on forward movement of the link member, and move downward along the vertical direction based on rearward movement of the link member.

According to an embodiment of the disclosure, the cylinder may include a switch to operate the cylinder to provide the driving force by being pushed. The link bracket may push the switch by moving downward.

According to an embodiment of the disclosure, the link bracket may be configured to move from a first position to a second position lower than the first position based on the rearward movement of the link member. The link bracket may be configured to move from the second position to the first position based on the forward movement of the link member.

According to an embodiment of the disclosure, the link member may include a first guide part configured to be connected to the link bracket. A lower surface of the first guide part may be inclined upward and rearward.

According to an embodiment of the disclosure, the link bracket may include a second guide part having a guide surface provided to be inclined upward and rearward to correspond to the lower surface of the first guide part.

According to an embodiment of the disclosure, as the link member moves rearward, at least a portion of the first guide part may be inserted into the second guide part. As the link member moves forward, at least a portion of the first guide part may be withdrawn from the second guide part.

According to an embodiment of the disclosure, the support stand may include a damping device to reduce an upward and downward moving speed along the vertical direction of the support arm and the link bracket.

According to an embodiment of the disclosure, the damping device may include a moving member to move upward or downward along the vertical direction together with the link bracket; a guide rail to guide the upward and downward movements of the moving member along the vertical direction; and a friction member between the moving member and the guide rail to increase a frictional force of the moving member against the guide rail.

Another aspect of the present disclosure provides a display apparatus including a display having a long side and a short side, a support arm provided at the rear of the display to rotatably support the display such that the display is positioned in a first orientation in which the long side is disposed horizontally or in a second orientation rotated by a first angle from the first orientation so that the long side is disposed vertically, and a cylinder provided to provide a driving force such that the support arm moves upward, and including a support stand provided to support the support arm such that the support arm is movable along a vertical direction. The support arm includes a link member provided to move forward or rearward based on the display being rotated to a second angle smaller than the first angle with respect to the support arm. The support stand is provided to move the display and the support arm upward by operating the cylinder based on a rearward movement of the link member.

DESCRIPTION OF DRAWINGS

These and/or other aspects of the disclosure will become apparent and more readily appreciated from the following description of embodiments, taken in conjunction with the accompanying drawings of which.

MODE OF THE DISCLOSURE

Various embodiments and terms in this document are not intended to limit the technical features described in this document to specific embodiments, and should be understood to include various modifications, equivalents, or substitutes of the embodiments.

In connection with the description of the drawings, like reference numbers may be used for like or related elements.

The singular form of a noun corresponding to an item may include one item or a plurality of items, unless the relevant context clearly dictates otherwise.

In this document, each of phrases such as "A or B," "at least one of A and B," "at least one of A or B," "A, B or C," "at least one of A, B and C," and "at least one of A, B, or C" may include any one of the items listed together in the corresponding one of the phrases, or all possible combinations thereof.

The term "and/or" includes any combination of a plurality of related components or any one of a plurality of related components.

Terms such as "first," "second," "primary," and "secondary" may simply be used to distinguish a given component from other corresponding components, and do not limit the corresponding components in any other respect (e.g., importance or order).

When any (e.g., first) component is referred to as being "coupled" or "connected" to another (e.g., second) component with or without the terms "functionally" or "communicatively", this means that the any component may be connected to the other component directly (e.g., by wire), wirelessly, or through a third component.

The terms "comprises" and "has" are intended to indicate that there are features, numbers, steps, operations, components, parts, or combinations thereof described in this document, and do not exclude the presence or addition of one or more other features, numbers, steps, operations, components, parts, or combinations thereof.

When any component is referred to as being "connected", "coupled", "supported" or "in contact" with another component, this includes a case in which the components are indirectly connected, coupled, supported, or in contact with each other through a third component as well as directly connected, coupled, supported, or in contact with each other.

When any component is referred to as being located "on" or "over" another component, this includes not only a case in which any component is in contact with another component but also a case in which another component is present between the two components.

Expressions related to direction such as terms "front," "rear," "left," "right," "up," "down," etc. used in the description below are defined based on the drawings, and the like used in the following description are defined with reference to the drawings, and the shape and position of each component are not limited by these terms.

Figure 1:
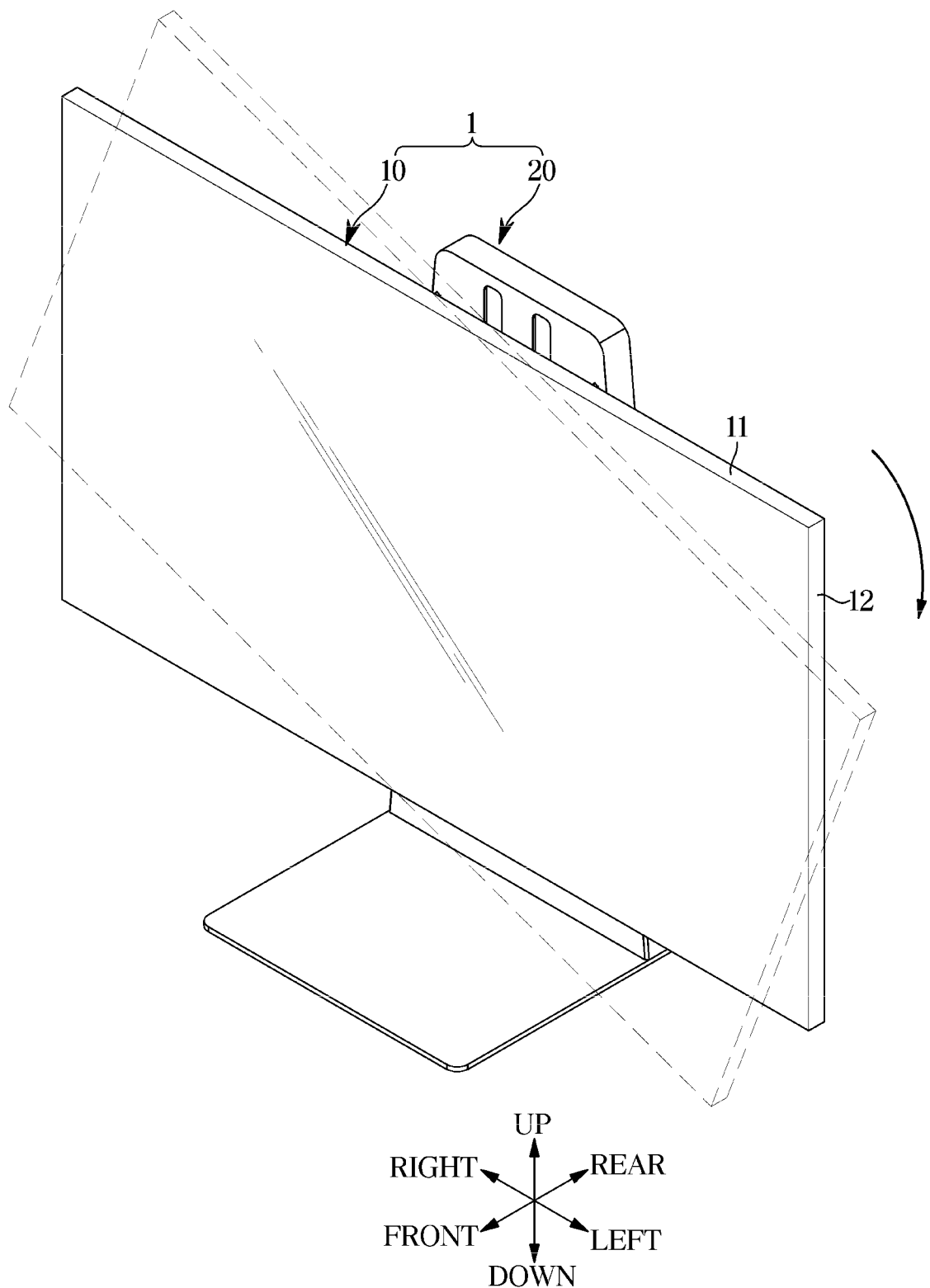
FIG. 1 illustrates a display arranged horizontally in a display apparatus according to an embodiment of the disclosure.
Figure 2:
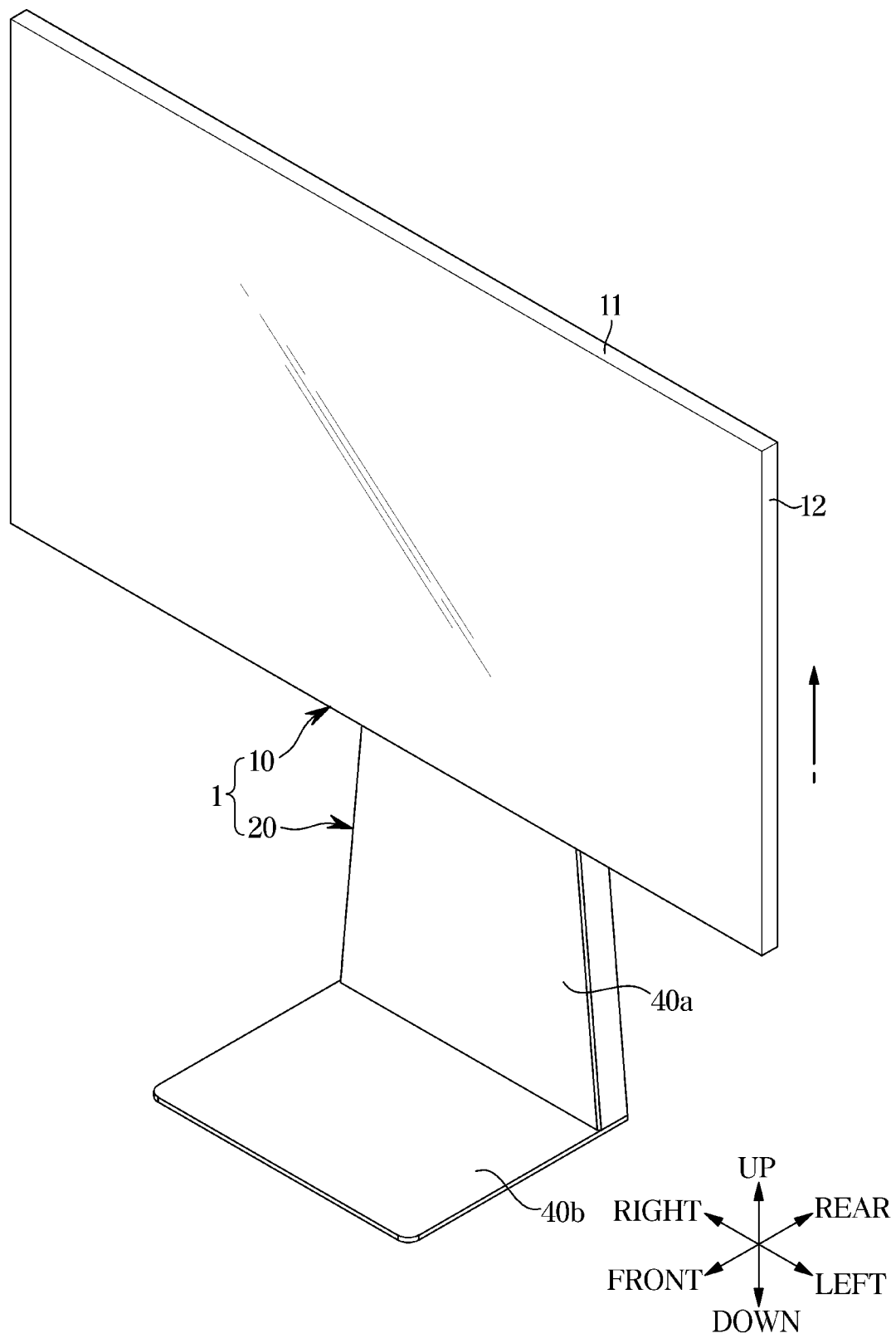
FIG. 2 illustrates the display moved upward with respect to a support device in the display apparatus according to an embodiment of the disclosure.
Figure 3:
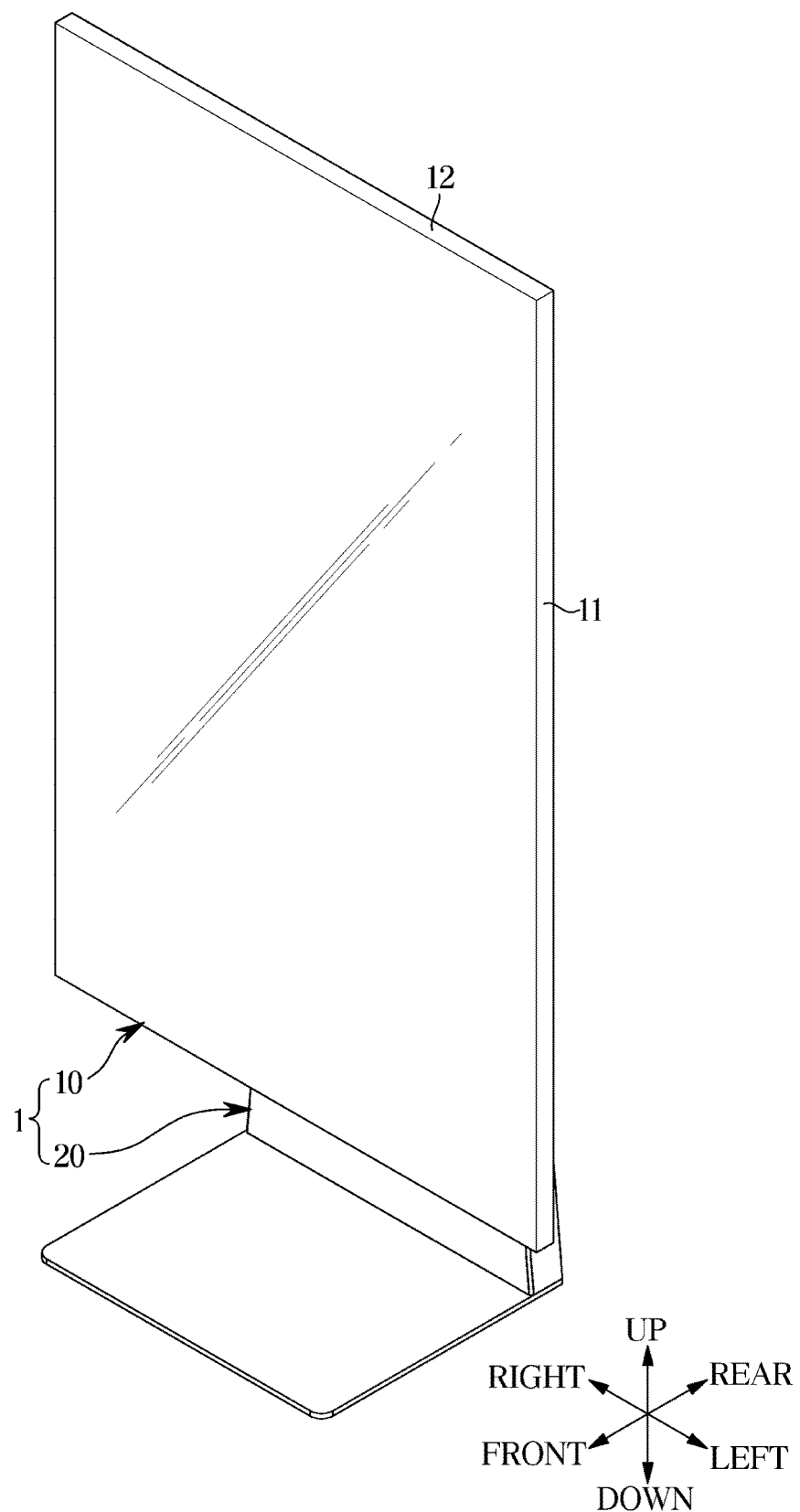
FIG. 3 illustrates the display arranged vertically in the display apparatus according to an embodiment of the disclosure.
Figure 4:
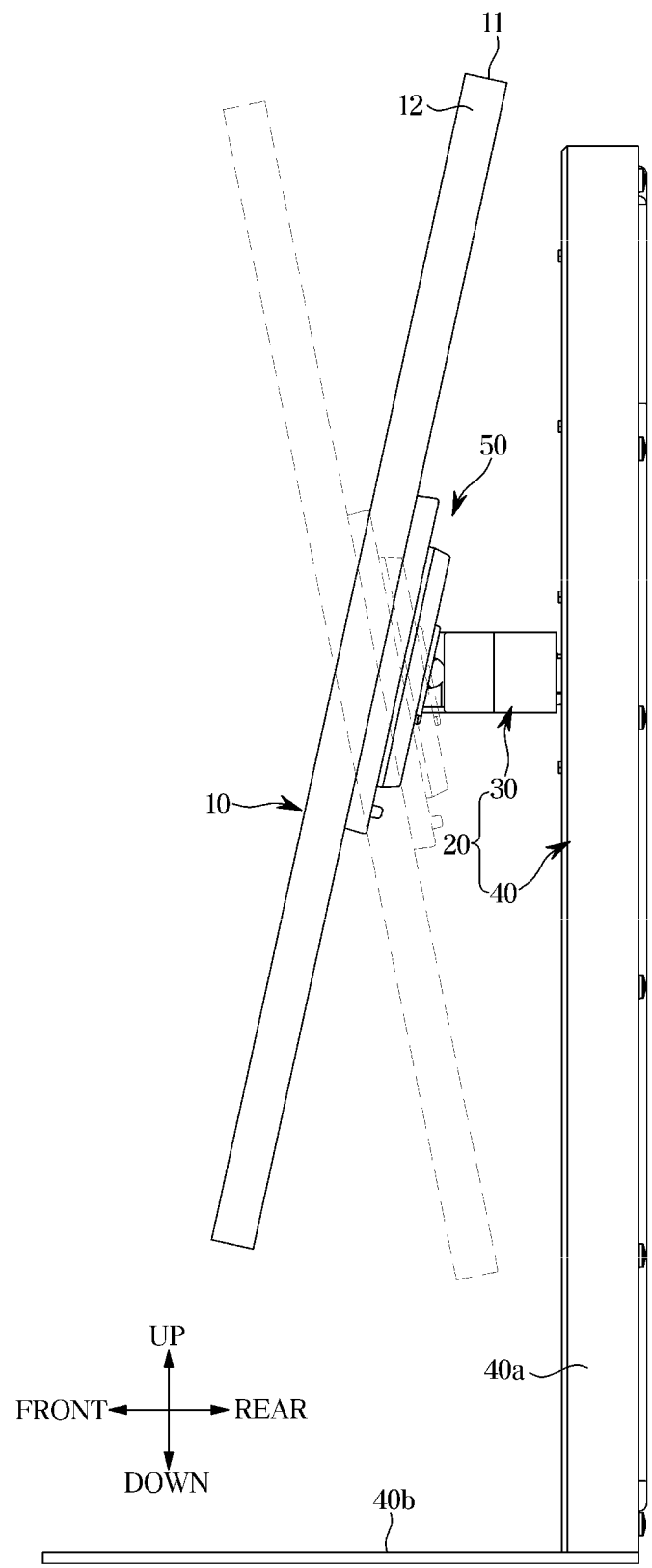
FIG. 4 is a side view of the display apparatus according to an embodiment of the disclosure.

FIG. 1 illustrates a display arranged horizontally in a display apparatus according to an embodiment. FIG. 2 illustrates the display moved upward with respect to a support device in the display apparatus according to an embodiment. FIG. 3 illustrates the display arranged vertically in the display apparatus according to an embodiment. FIG. 4 is a side view of the display apparatus according to an embodiment.

Referring to FIGS. 1 to 4, a display apparatus 1 may include a display 10 and a support device 20 provided to support the display 10. The support device 20 may include a support arm 30 and a support stand 40. The display 10 may include a bracket 50 provided on a rear surface of the display 10.

The display 10, which is a device that displays information, materials, data, etc. in the form of text, figures, graphs, images, etc., may include a television, a monitor, etc.

The display 10 may be configured to display a screen. The display 10 may include a self-light emitting display panel (not shown) such as an organic light-emitting diode (OLED) or a non-self-light emitting display panel (not shown) such as a liquid crystal display (LCD). There are no special limits on the type of display panel.

The display 10 may be provided such that a length of a horizontal side and a length of a vertical side are different from each other. The display 10 may be provided to have a long side 11 and a short side 12. The display 10 may be provided in a rectangular plate shape. Alternatively, the display 10 may be provided as a curved display in which the long side 11 is provided in a curved shape.

The support device 20 may include the support arm 30 and the support stand 40. The support arm 30 may be provided to connect the display 10 and the support stand 40. The support stand 40 may support the display 10 such that the screen of the display 10 faces a user. The screen of the display 10 may be displayed on a front surface of the display 10.

The support stand 40 may include a base 40b provided to be in contact with a floor surface, and a stand 40a extending upward from the base 40b. The base 40b may function to substantially expand an area of a lower surface of the stand 40a. The base 40b allows the stand 40a to stably stand on its own on the floor surface by substantially expand the area of the lower surface of the stand 40a.

The display 10 may be provided to enable pivot rotation with respect to the support device 20. In other words, the support device 20 may support the display 10 such that the display 10 may enable the pivot rotation. The pivot rotation may refer to an operation in which a display is rotated around a predetermined axis extending along a front-rear direction. In this specification, "rotation" of the display may refer to "pivot rotation" of the display.

The display 10 may be provided to be rotatable with respect to the support device 20 to be positioned in any one of a first orientation in which the long side 11 is disposed horizontally and a second orientation in which the long side 11 is disposed vertically. The display 10 may be positioned from the first orientation to the second orientation by being rotated in a first direction. The display 10 may be positioned from the first orientation to the second orientation by being rotated in a second direction opposite to the first direction. The display 10 may be positioned from the second orientation to the first orientation by being rotated in the first direction. The display 10 may be positioned from the second orientation to the first orientation by being rotated in the second direction. The first and second directions described above may refer to clockwise and counterclockwise, respectively. The display 10 may be provided to be rotatable in both directions with respect to the support device 20.

The display 10 may be provided to be movable along a vertical direction within a predetermined range with respect to the support device 20. The display 10 may move upward or downward with respect to the support device 20 between a lower end position and an upper end position. In other words, the support device 20 may support the display 10 such that the display 10 is movable in an up-down direction with respect to the support device 20 within the predetermined range.

Referring to FIG. 4, the display 10 may be provided to enable tilt rotation. As the display 10 moves with tilt rotation, the screen of the display 10 may face a lower side or an upper side. The tilt rotation of the display may refer to the display 10 rotating within a predetermined angle range around a predetermined axis parallel to the floor surface. The support arm 30 may support the display 10 to enable tilt rotation.

Referring to FIGS. 1 and 2, the display apparatus 1 may be provided to automatically move the display 10 upward when the display 10 is rotated at a predetermined angle. The support stand 40 may be provided to move the display 10 upward when the display 10 is rotated at the predetermined angle in the first or second direction. The support stand 40 may move the display 10 upward until the display 10 is positioned at the upper end position, which is the highest position within a range in which the display 10 is movable in the up-down direction.

The predetermined angle for the display 10 to move upward may be smaller than an angle of 90 degrees. For example, when the display 10 is rotated at an angle of about 45 degrees in the first or second direction, the support stand 40 may move the display 10 upward. A detailed explanation of this will be provided later.

Referring to FIG. 3, the display 10, which has moved upward, may be positioned from the first orientation to the second orientation by being rotated in the first or second direction. Even when the display 10 positioned at the uppermost end of the support stand 40 is rotated to be positioned from the first orientation to the second orientation, the display 10 does not collide with the floor surface because the display 10 is sufficiently spaced apart from the floor surface in the up-down direction. That is, a collision between the display 10 and the floor surface due to rotation of the display 10 may be prevented.

When the display 10 positioned in the first orientation is rotated in a state of being not sufficiently spaced from the floor surface in the up-down direction, an edge portion of the display 10 may collide with the floor, which may cause the display 10 to be damaged. The "floor surface" may refer to a physical space where the support stand 40 is placed. The "floor surface" may refer to some region on a desk or to some region of an upper surface of an object having a flat upper surface.

Conventionally, in order to prevent a collision with the floor surface from occurring when the display positioned in the first orientation is rotated, the user is required to place the display at the uppermost end of the support stand and then rotate the display. However, when the user accidentally rotates the display in a state of not positioning the display at the uppermost end of the support stand, as described above, the display may be damaged by colliding with the floor surface.

According to the present disclosure, a collision between the display 10 and the floor surface due to rotation of the display 10 may be prevented. The display 10 may be provided to move upward with respect to the support stand 40 when the display 10 positioned in the first orientation is rotated at the predetermined angle to be positioned in the second orientation, thereby preventing a collision between the display 10 and the floor surface. More specifically, the display 10 may be provided to automatically move to the uppermost end of the support stand 40 when rotated at the predetermined angle smaller than 90 degrees. When the display 10 moves to the uppermost end of the support stand 40 and then is rotated, the display 10 may be positioned from the first orientation to the second orientation without collision between the display 10 and the floor surface.

Figure 5:
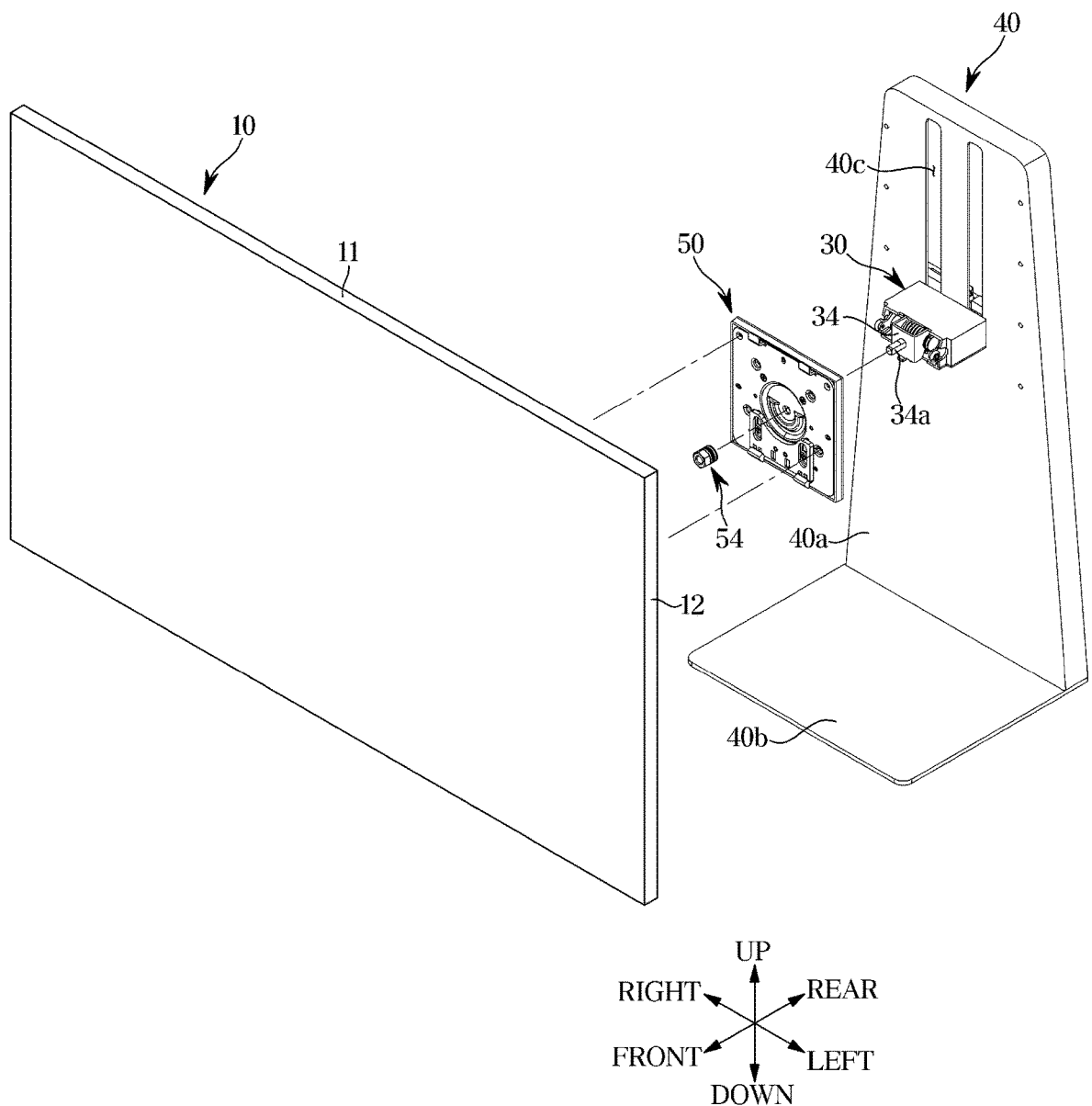
FIG. 5 is a schematic exploded view of the display apparatus according to an embodiment of the disclosure.
Figure 6:
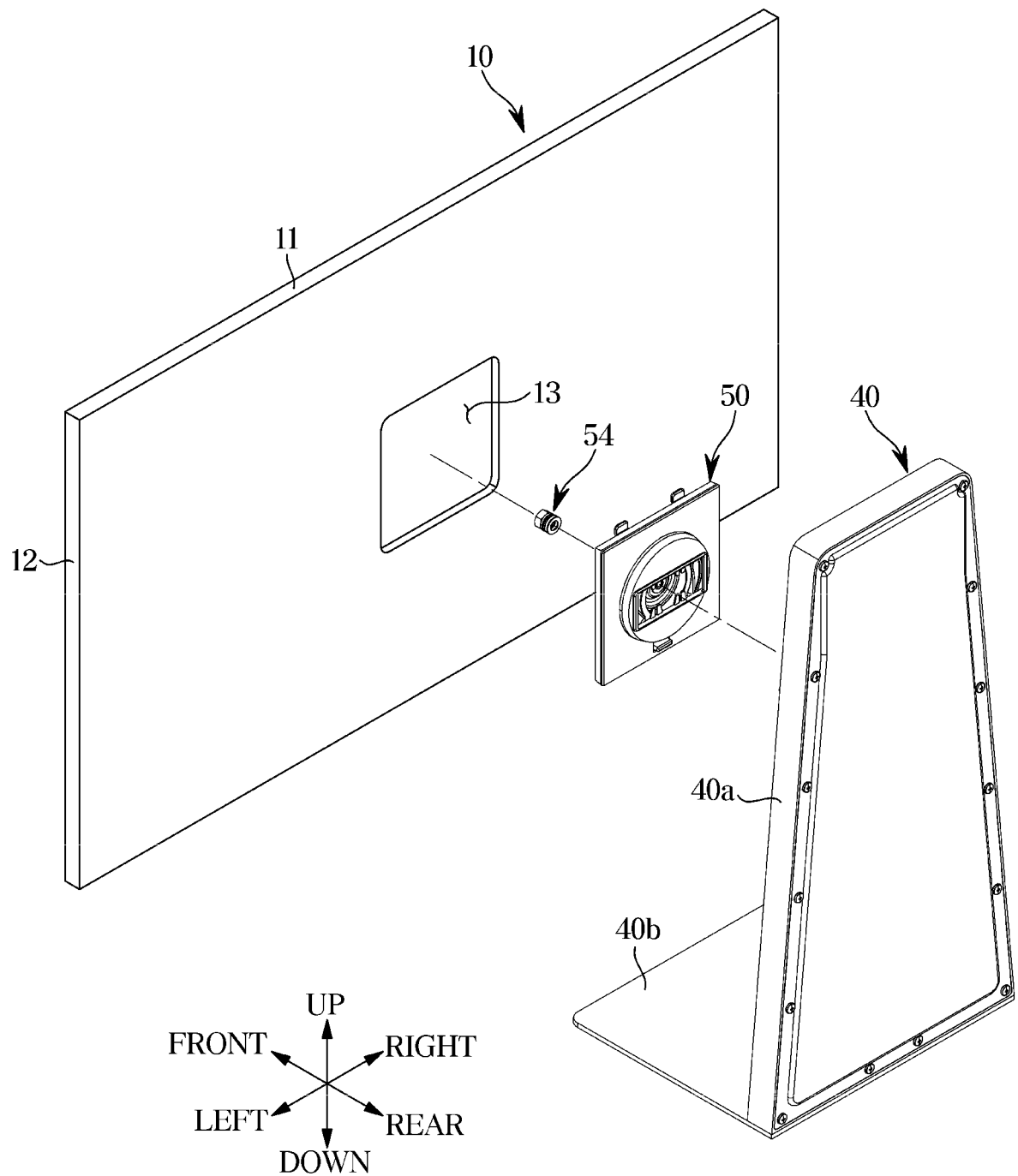
FIG. 6 is a view showing FIG. 5 from a different angle.
Figure 7:
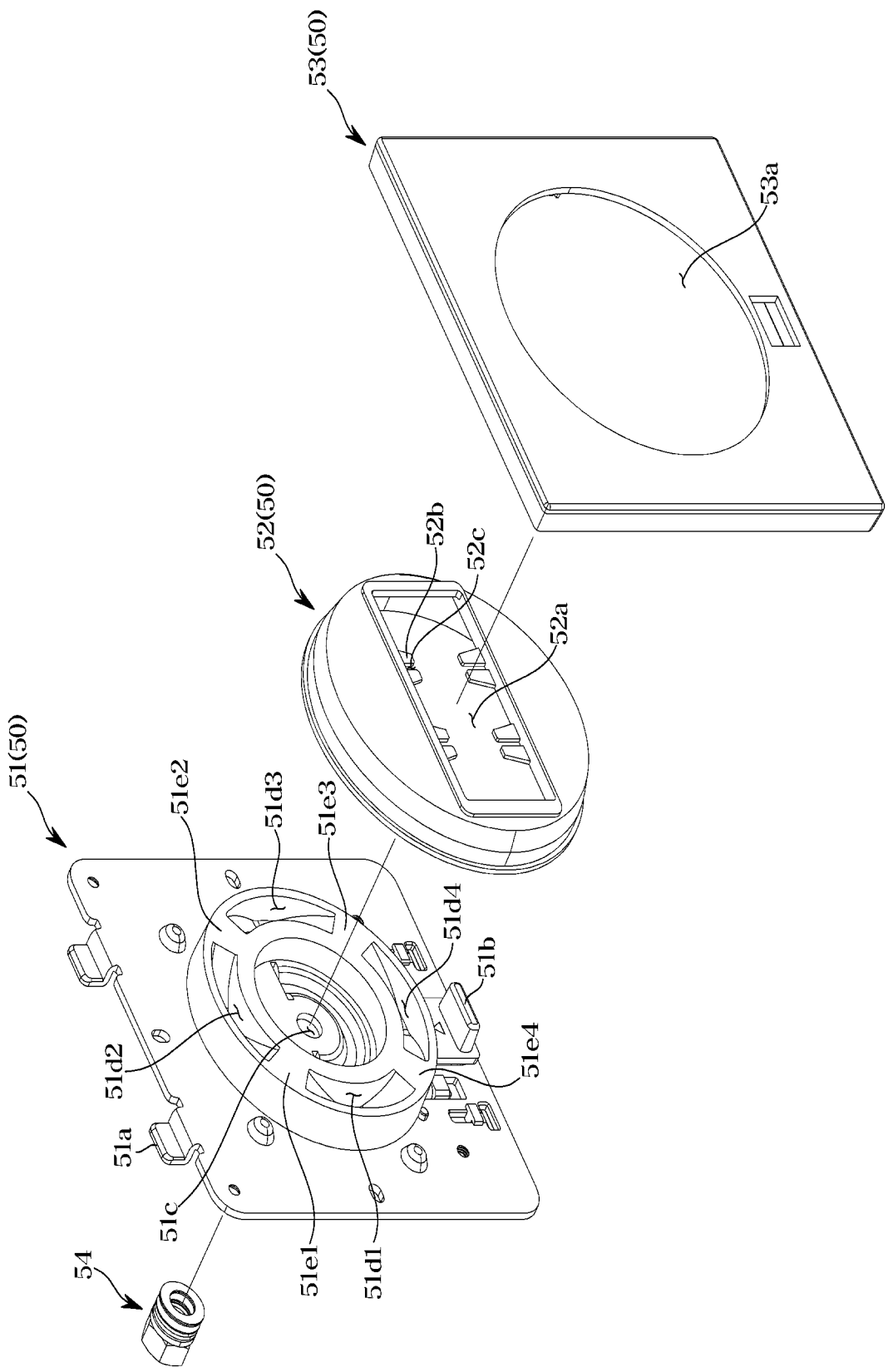
FIG. 7 is an exploded view of a bracket in the display apparatus according to an embodiment of the disclosure.
Figure 8:
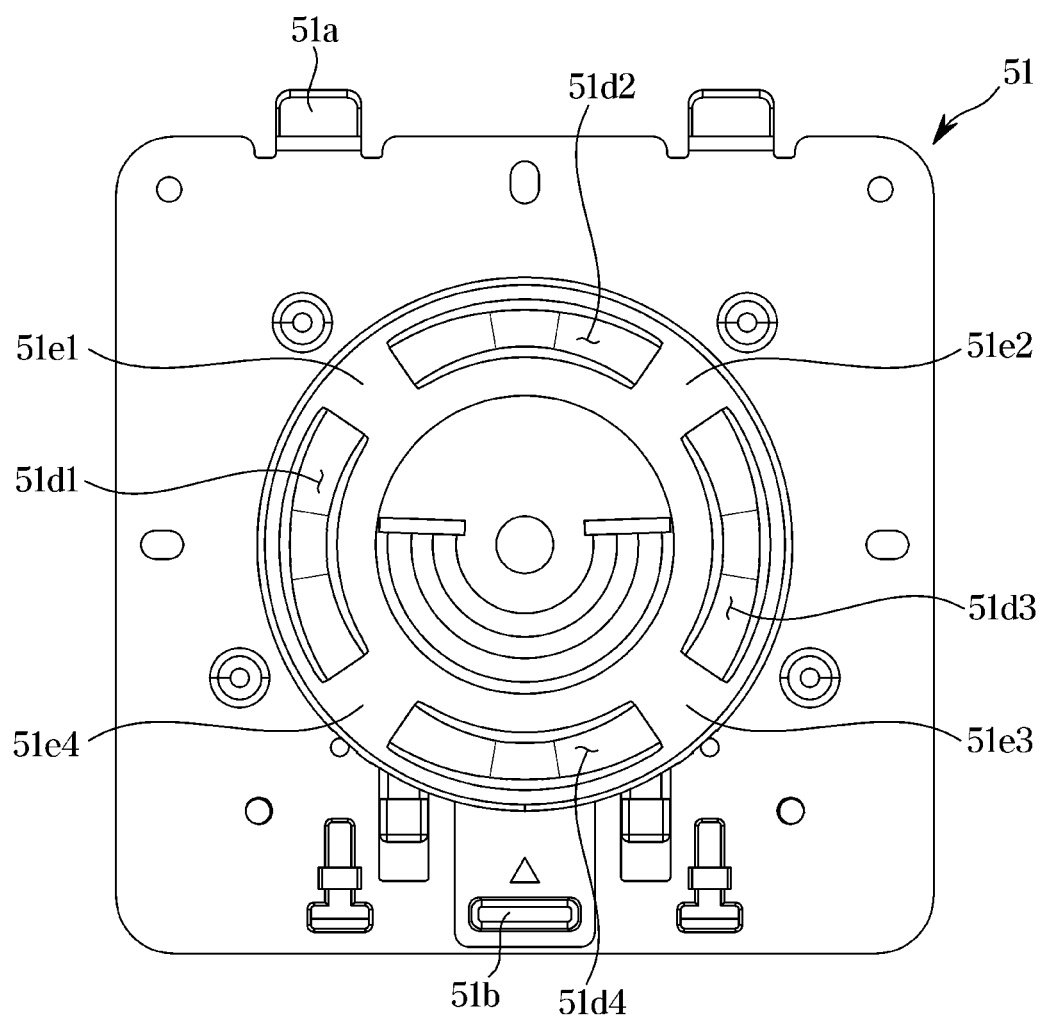
FIG. 8 illustrates a bracket body in the display apparatus according to an embodiment of the disclosure.

FIG. 5 is a schematic exploded view of the display apparatus according to an embodiment. FIG. 6 is a view showing FIG. 5 from a different angle. FIG. 7 is an exploded view of a bracket in the display apparatus according to an embodiment. FIG. 8 illustrates a bracket body in the display apparatus according to an embodiment.

Referring to FIGS. 5 and 6, the display apparatus 1 may include the display 10, the bracket 50 provided to be coupled to the rear surface of the display 10, the support arm 30 provided to support the display 10 by being coupled to the bracket 50, and the support stand 40 provided to support the support arm 30 to be movable up and down.

Referring to FIG. 6, a bracket groove 13 may be provided on the rear surface of the display 10. The bracket 50 may be inserted and coupled to the bracket groove 13. The bracket 50 may be provided to be coupled to the display 10 and the support arm 30. The bracket 50 may be detachably coupled to the display 10. Alternatively, the bracket 50 may be formed integrally with the display 10.

The support device 20 may include the support arm 30 and the support stand 40. The support arm 30 may be coupled to the bracket 50 to support the bracket 50. The display 10 may be coupled to the front of the bracket 50. The support arm 30 may support the display 10 through the bracket 50.

Referring to FIGS. 5 to 7, a bracket hole 51c may be formed in a center of the bracket 50. A coupling shaft 34a of the support arm 30 may be inserted into the bracket hole 51c. The bracket 50 and the support arm 30 may be coupled by coupling a coupling member 54 to the coupling shaft 34a penetrating the bracket hole 51c.

The support stand 40 may be provided to support the support arm 30. The support stand 40 may support the support arm 30 such that the support arm 30 is movable within a predetermined range along the vertical direction. The support stand 40 may include a stand opening 40c. The stand opening 40c may extend along the up-down direction. The support arm 30 may move in the up-down direction between a lower end and an upper end of the stand opening 40c. However, the present disclosure is not limited thereto.

The support arm 30 may be provided to be movable in the up-down direction between one point adjacent to the lower end of the stand opening 40c and one point adjacent to the upper end of the stand opening 40c.

Referring to FIG. 7, the bracket 50 may include a bracket body 51, a rotation cover 52, and a fixed cover 53.

The bracket body 51 may be provided to be coupled to the bracket groove 13 provided on the rear surface of the display 10. The bracket body 51 may include a first coupling protrusion 51a and a second coupling protrusion 51b. The first coupling protrusion 51a may be provided at an upper end of the bracket body 51. The second coupling protrusion 51b may be provided at a lower end of the bracket body 51. The second coupling protrusion 51b may be provided to be movable in the up-down direction within a predetermined range with respect to the bracket body 51. The second coupling protrusion 51b may be elastically biased to move downward. The bracket body 51 may be inserted into the bracket groove 13 in a state in which the first coupling protrusion 51a is inserted into the bracket groove 13 and the second coupling protrusion 51b is moved upward. After the bracket body 51 is inserted into the bracket groove 13, the bracket body 51 may be coupled to the bracket groove 13 by moving the second coupling protrusion 51b downward.

The bracket body 51 may include guide grooves 51d1, 51d2, 51d3, and 51d4 extending in an arc shape.

The guide grooves 51d1, 51d2, 51d3, and 51d4 may include the first guide groove 51d1, the second guide groove 51d2, the third guide groove 51d3, and the fourth guide groove 51d4. The first guide groove 51d1, the second guide groove 51d2, the third guide groove 51d3, and the fourth guide groove 51d4 may each extend in an arc shape and may be provided to be spaced apart from each other. The first guide groove 51d1, the second guide groove 51d2, the third guide groove 51d3, and the fourth guide groove 51d4 may each be provided such that a depth of a groove varies along a circumferential direction of the arc. Specifically, the first guide groove 51d1, the second guide groove 51d2, the third guide groove 51d3, and the fourth guide groove 51d4 may each be provided such that the depth of the groove is largest at a center and becomes smaller as a distance from the center increases.

Connection portions 51e1, 51e2, 51e3, and 51e4 may be provided between the first guide groove 51d1, the second guide groove 51d2, the third guide groove 51d3, and the fourth guide groove 51d4. Specifically, the first connection portion 51e1 may be provided between the first guide groove 51d1 and the second guide groove 51d2, the second connection portion 51e2 may be provided between the second guide groove 51d2 and the third guide groove 51d3, the third connection portion 51e3 may be provided between the third guide groove 51d3 and the fourth guide groove 51d4, and the fourth connection portion 51e4 may be provided between the fourth guide groove 51d4 and the first guide groove 51d1.

The first connection portion 51e1, the second connection portion 51e2, the third connection portion 51e3, and the fourth connection portion 51e4 may be positioned at the same positions as points with the smallest depth in the first guide groove 51d1, the second guide groove 51d2, the third guide groove 51d3, and the fourth guide groove 51d4 with respect to the front-rear direction.

The rotation cover 52 may be provided to be rotatable with respect to the bracket body 51 and the bracket cover 53. The rotation cover 52 may include a rotation cover opening 52a, support protrusions 52b provided to support a coupling bracket 34, which will be described later, and a support groove 52c formed between the support protrusions 52b so that the coupling bracket 34 is inserted therein.

At least a portion of the coupling bracket 34 of the support arm 30 may be inserted into the support groove 52c to be supported by the support protrusion 52b.

The bracket cover 53 may include a bracket cover opening 53a. The rotation cover 52 may be inserted into the bracket cover opening 53a. The rotation cover 52 inserted into the bracket cover opening 53a may be rotated relative to the bracket cover 53. The bracket cover 53 may be provided to cover at least a portion of the bracket body 51. The bracket cover 53 may be coupled to the bracket body 51.

Figure 9:
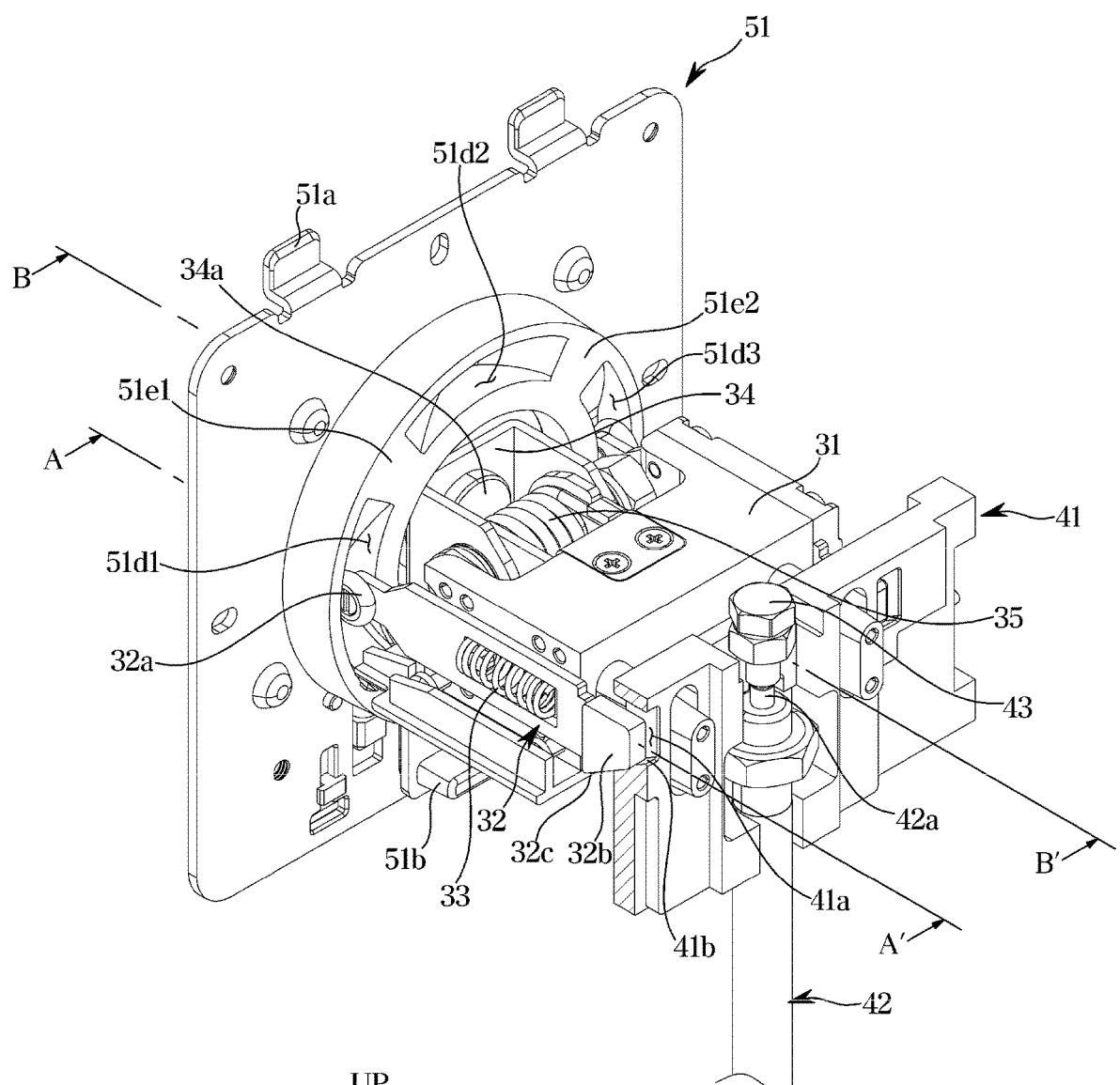
FIG. 9 illustrates the bracket, a support arm, and a portion of a support stand in the display apparatus according to an embodiment of the disclosure.
Figure 9:
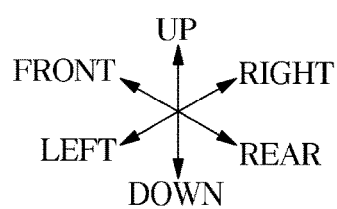
Figure 10:
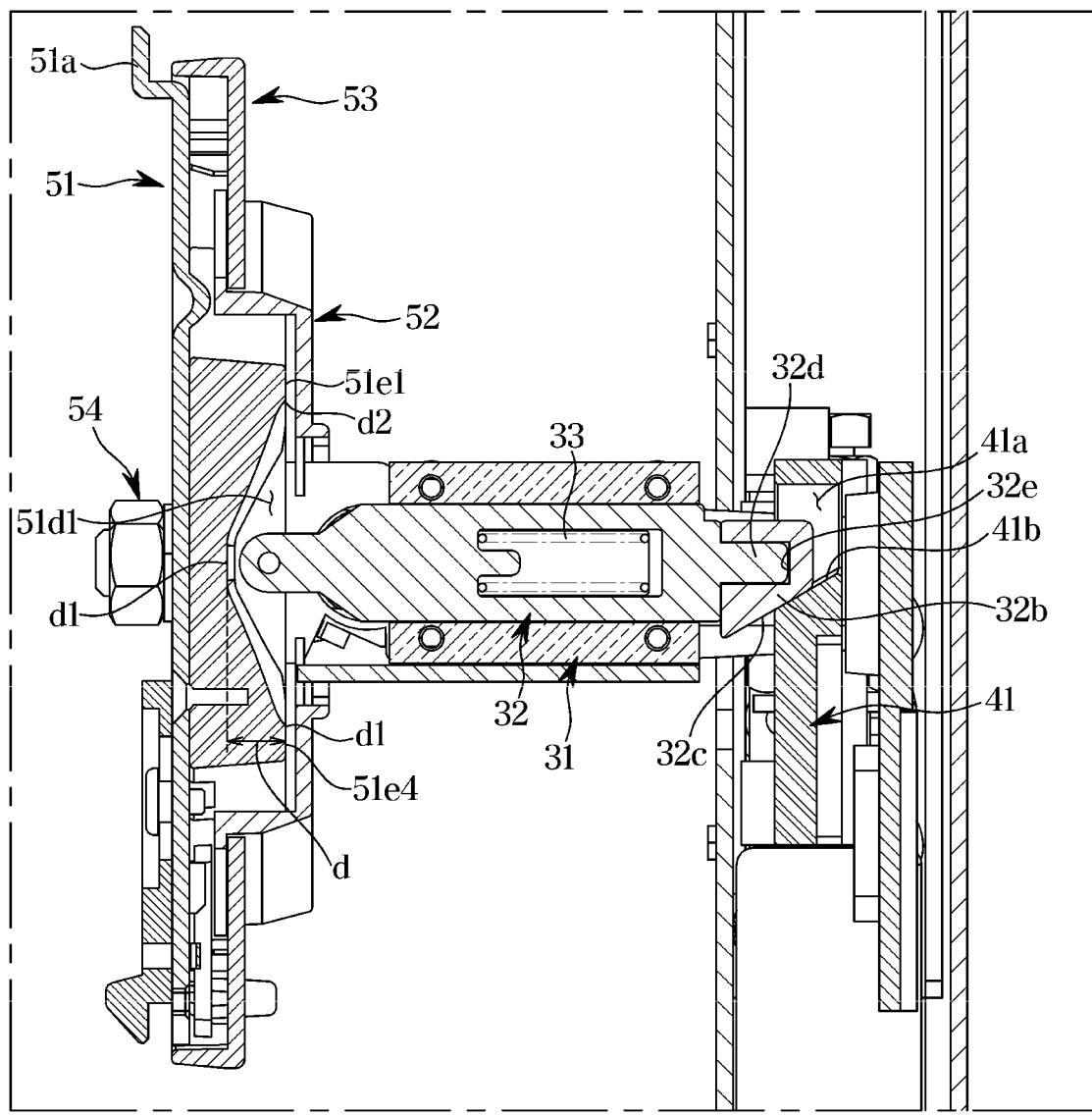
FIG. 10 is a cross-sectional view taken along line A-A' in FIG. 9.
Figure 10:
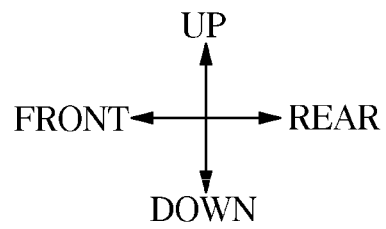
Figure 11:
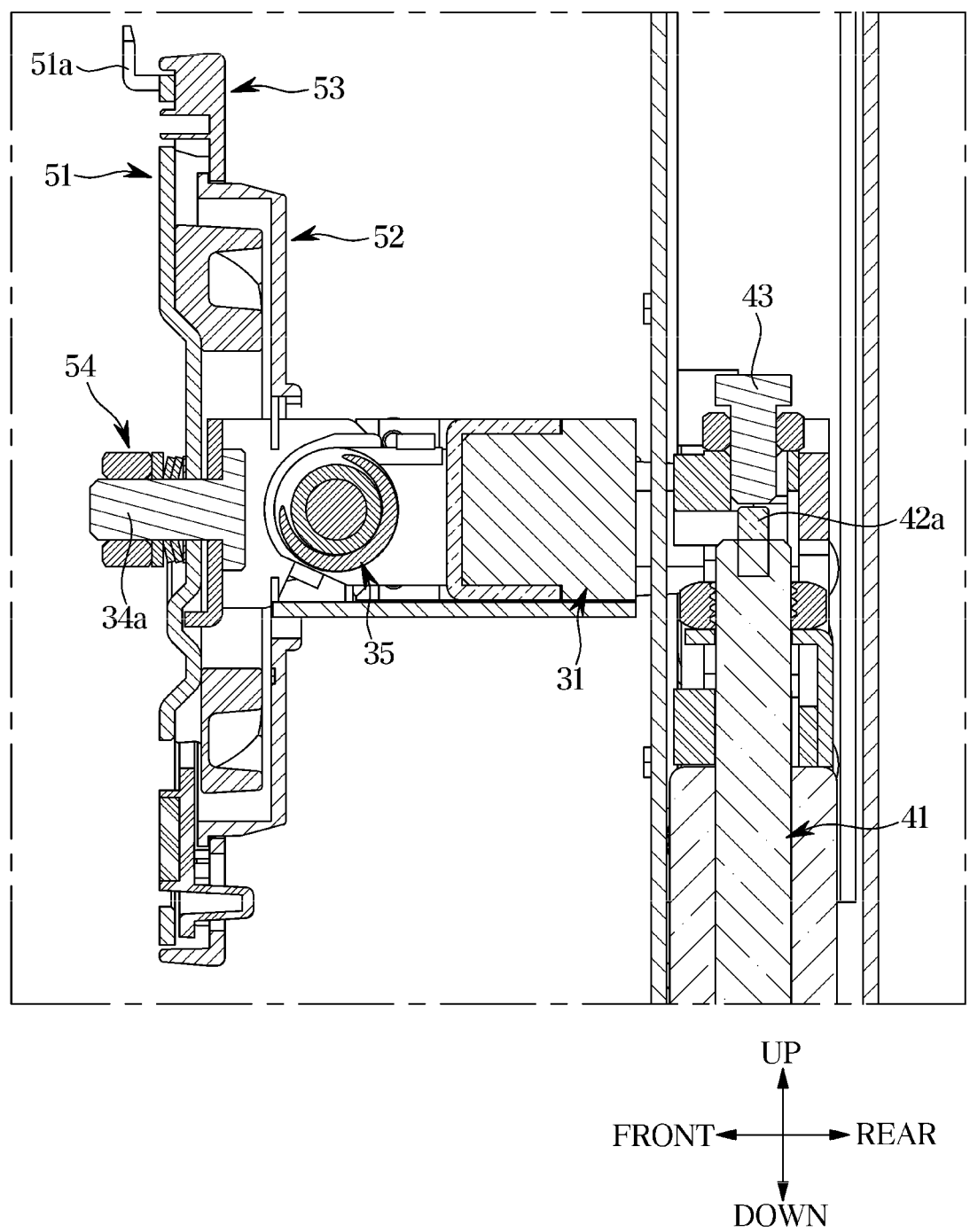
FIG. 11 is a cross-sectional view taken along line B-B' in FIG. 9.

FIG. 9 illustrates the bracket, a support arm, and a portion of a support stand in the display apparatus according to an embodiment. FIG. 10 is a cross-sectional view taken along line A-A' in FIG. 9. FIG. 11 is a cross-sectional view taken along line B-B' in FIG. 9.

Referring to FIG. 9, the support arm 30 may include the coupling bracket 34 provided to be coupled to the bracket 50, a support member 31 provided to support the coupling bracket 34 to enable tilt rotation, and a link member 32 provided to be movable forward or rearward relative to the support member 31.

The coupling bracket 34 may be coupled to the bracket body 51 by the coupling shaft 34a penetrating the coupling bracket 34 and the bracket body 51 and the coupling member 54 coupled to the coupling shaft 34a.

The support member 31 may support the coupling bracket 34 such that the coupling bracket 34 enables tilt rotation. The tilt rotation may refer to rotating around a predetermined axis extending along a left-right direction.

The support arm 30 may include a rotational elastic member 35 provided to elastically bias the coupling bracket 34 so that the coupling bracket 34 rotates in one direction with respect to the support member 31. The rotational elastic member 35 may provide an elastic force to the coupling bracket 34 so that the coupling bracket 34 rotates in one direction with respect to the support member 31. The rotational elastic member 35 may include a torsion spring.

The link member 32 may be coupled to the support member 31 to be movable forward or rearward with respect to the support member 31 within a predetermined range. The link member 32 may be provided to move forward or rearward based on the display 10 rotating with respect to the support arm 30.

The support arm 30 may include an elastic member 33 provided to elastically bias the link member 32 so that the link member 32 moves forward. The elastic member 33 may include a compression spring. Alternatively, the elastic member 33 may include a tension spring.

The elastic member 33 may be provided to elastically bias the link member 32 forward so that a front portion of the link member 32 is inserted into the guide grooves 51d1, 51d2, 51d3, and 51d4.

The link member 32 may include a roller 32a provided at the front portion of the link member 32. The roller 32a may be provided to reduce friction between the guide grooves 51d1, 51d2, 51d3, and 51d4 or the connection portions 51e1, 51e2, 51e3, and 51e4 and the link member 32 when the display 10 is rotated. The roller 32a may smooth a rotation of the display 10 and a forward or rearward movement of the link member 32 depending on the rotation of the display 10.

The link member 32 may include a first guide part 32b provided at a rear portion of the link member 32. The first guide part 32b may be provided such that a lower surface 32c thereof is inclined upward toward the rear. The first guide part 32b may be provided to be coupled to a rear end of the link member 32. Alternatively, the first guide part 32b may be formed integrally with the link member 32.

The support stand 40 may include a link bracket 41 provided to be coupled to the support member 31. The link bracket 41 may be provided to move downward based on the rearward movement of the link member 32.

The support stand 40 may include a cylinder 42 provided to provide a driving force such that the support arm 30 moves upward. The cylinder 42 may include a switch 42a provided at an upper end of the cylinder 42. The switch 42a may be provided to operate the cylinder 42 by being pushed. However, the switch 42a may be provided in various structures and methods, and is not limited to the above structure. For example, the switch 42a may be configured to operate the cylinder 42 by being withdrawn from a state in which the switch 42a is inserted into the cylinder 42. The switch 42a may be provided at a lower end of the cylinder 42 or at another position other than the upper end of the cylinder 42.

The cylinder 42 may be provided to be operated as the switch 42a is pushed. When the cylinder 42 is operated, the cylinder 42 may provide the driving force to move the support arm 30 upward. When the cylinder 42 is operated, the cylinder 42 may be extended in the up-down direction. The support arm 30 may move upward by a force of the cylinder 42 extended in the vertical direction.

According to one embodiment, the cylinder 42 may include a fluid cylinder. For example, the cylinder 42 may include a gas cylinder or a hydraulic cylinder.

The link bracket 41 may be provided to move upward based on the forward movement of the link member 32. The link bracket 41 may be provided to move downward based on the rearward movement of the link member 32.

The link bracket 41 may include a second guide part 41a provided such that at least a portion of the link member 32 is inserted therein. The second guide part 41a may have a guide surface 41b provided to be inclined upward toward the rear to correspond to the lower surface 32c of the first guide part 32b.

The second guide part 41a may be provided as a groove or hole. FIG. 9 illustrates the second guide part 41a provided in the form of a hole, but the present disclosure is not limited thereto. The second guide part 41a may be provided in the form of a groove including the guide surface 41b.

The support stand 40 may include a push member 43 provided to move upward or downward together with the link bracket 41. The push member 43 may be provided to push the switch 42a of the cylinder 42 by moving downward together with the link bracket 41.

Referring to FIG. 10, when the display 10 is positioned in the first or second orientation, the link member 32 may be elastically biased forward. In other words, by the elastic member 33, the link member 32 may be maintained in a state of being inserted into any one of the first guide groove 51d1, the second guide groove 51d2, the third guide groove 51d3, and the fourth guide groove 51d4. FIG. 10 illustrates an example in which the link member 32 is inserted into the first guide groove 51d1. When the display 10 is positioned in the first or second orientation, the link member 32 may protrude forward to the maximum. When the link member 32 protrudes forward to the maximum, the position of the link member 32 may be referred to as a front position d1. When the link member 32 moves rearward to the maximum, the position of the link member 32 may be referred to as a rear position d2.

When the link member 32 is positioned at the front position d1, the elastic member 33 may be stretched to the maximum. When the link member 32 is positioned at the front position d1, at least a portion of the first guide part 32*b* may be withdrawn from the second guide part 41*a*. When the link member 32 is positioned at the front position d1, the first guide part 32*b* may be maximally withdrawn from the second guide part 41*a*.

Referring to FIG. 10, the first guide part 32*b* may include a protrusion insertion groove 32*e*. As an insertion protrusion 32*d* provided at the rear end of the link member 32 is inserted into the protrusion insertion groove 32*e*, the first guide part 32*b* may be coupled to the link member 32. However, the present disclosure is not limited thereto. As described above, the first guide part 32*b* and the link member 32 may be formed integrally.

Referring to FIG. 11, when the link member 32 is positioned at the front position d1, the switch 42*a* of the cylinder 42 may not be pushed. The cylinder 42 is not operated because the switch 42*a* is not pushed. When the support arm 30 moves downward in a state in which the cylinder 42 is not operated, the cylinder 42 may be maintained in a retracted state. The cylinder 42 may be provided to be maximally extended when the switch 42*a* is pushed in the state in which the cylinder 42 is retracted. Accordingly, the cylinder 42 may be maintained in the retracted state without being extended when the switch 42*a* is not pushed.

Figure 12:
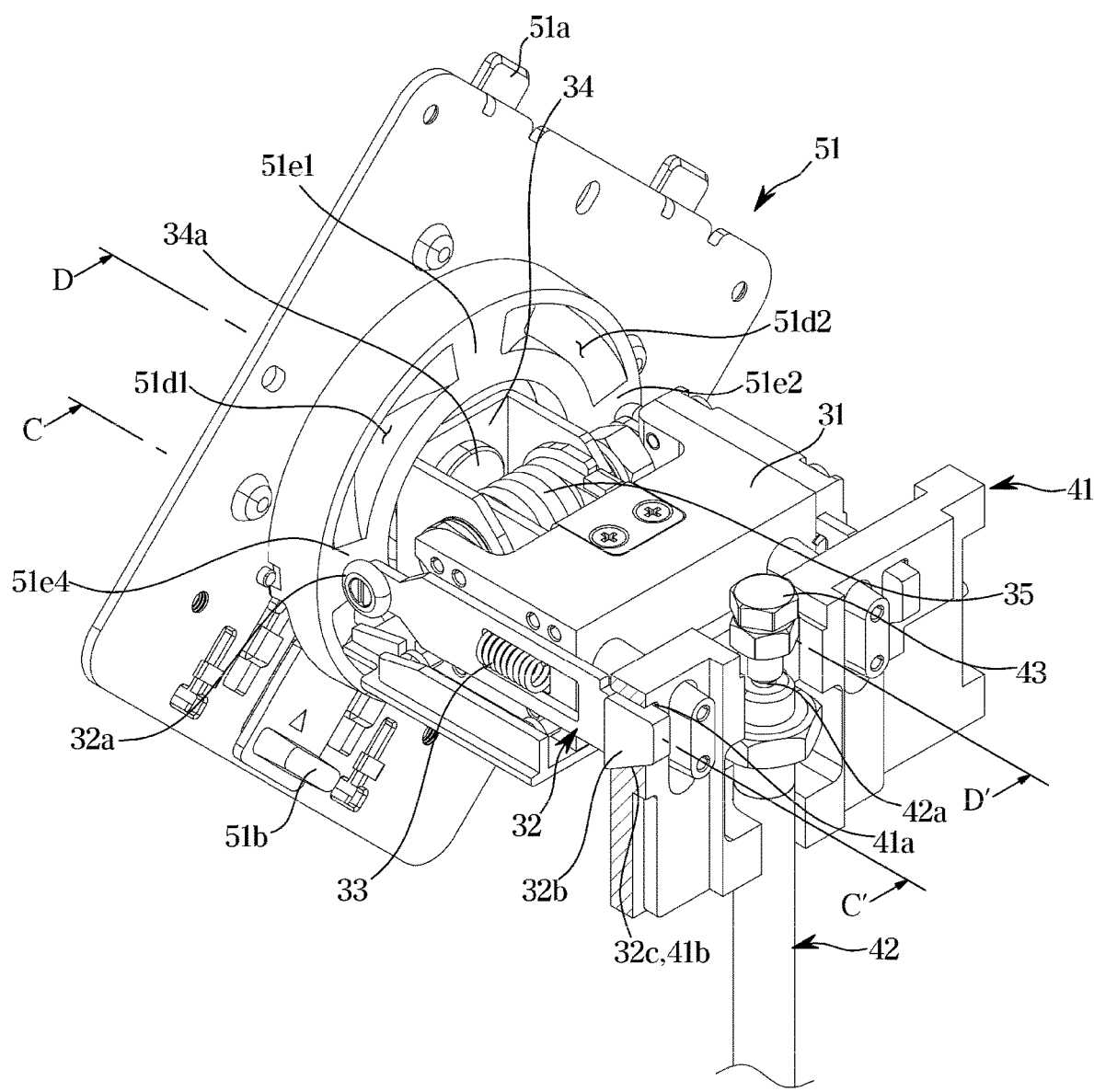
FIG. 12 illustrates the support arm, the bracket rotated at a predetermined angle with respect to the support arm, and a portion of the support stand in the display apparatus according to an embodiment of the disclosure.
Figure 13:
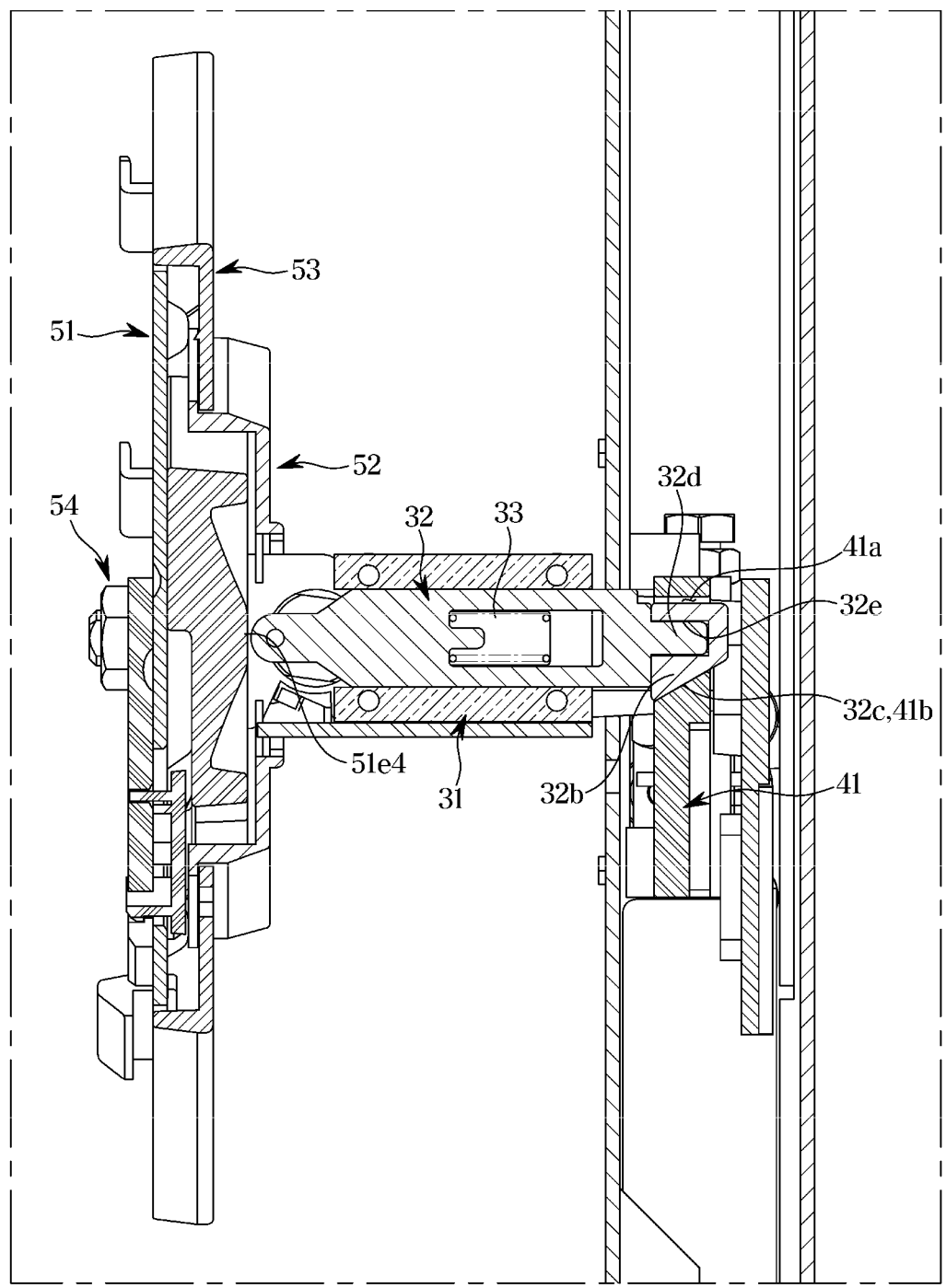
FIG. 13 is a cross-sectional view taken along line C-C' in FIG. 12.
Figure 13:
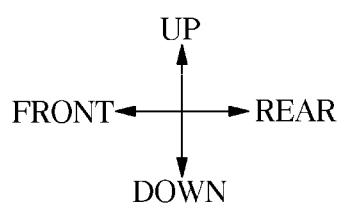
Figure 14:
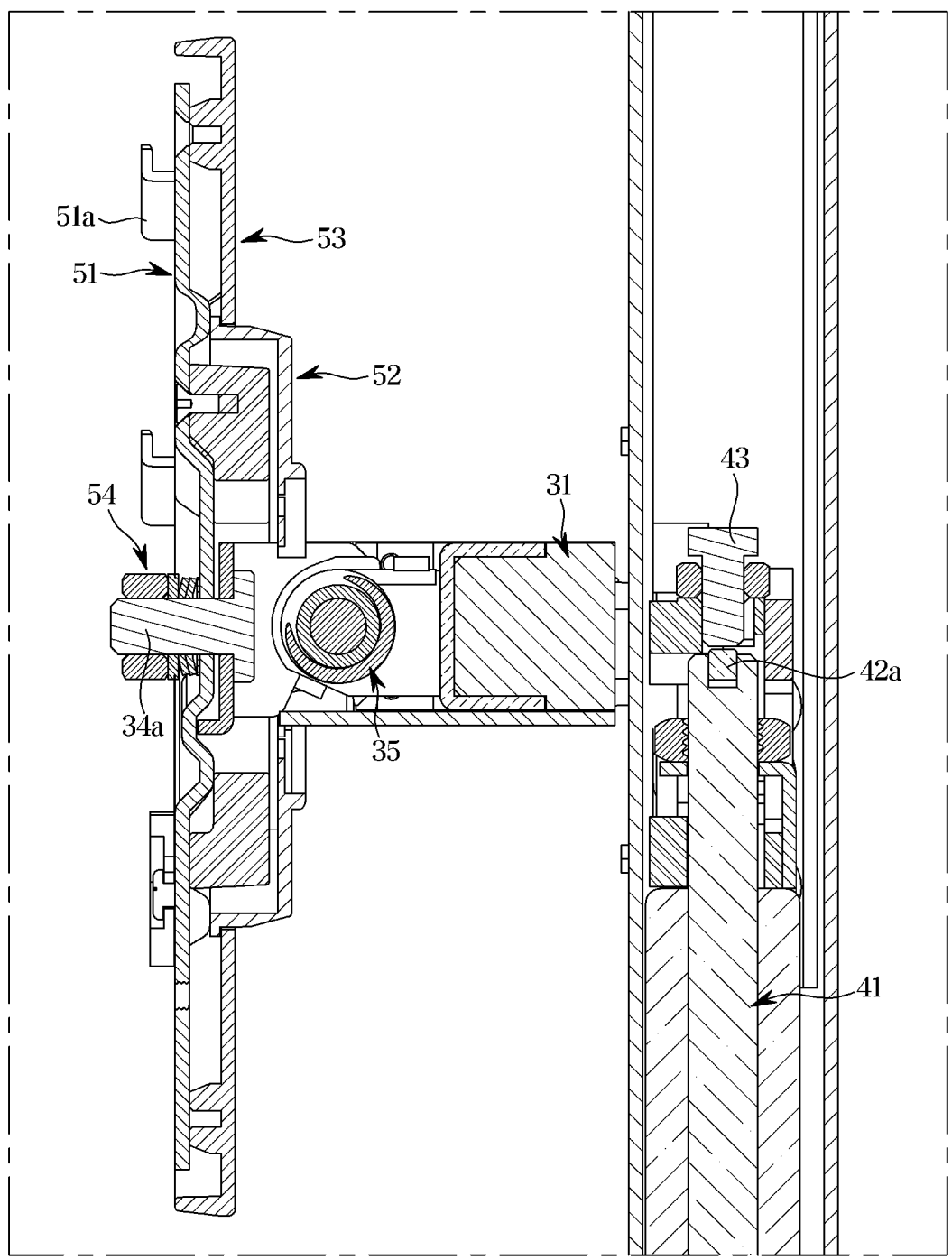
FIG. 14 is a cross-sectional view taken along line D-D' in FIG. 12.
Figure 14:
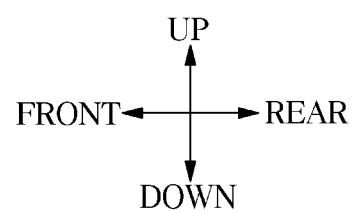

FIG. 12 illustrates the support arm, the bracket rotated at a predetermined angle with respect to the support arm, and a portion of the support stand in the display apparatus according to an embodiment. FIG. 13 is a cross-sectional view taken along line C-C' in FIG. 12. FIG. 14 is a cross-sectional view taken along line D-D' in FIG. 12.

Referring to FIG. 12, the bracket 50 and the display 10 coupled to the bracket 50 may enable the pivot rotation with respect to the support arm 30. When the display 10 performs the pivot rotation at the predetermined angle with respect to the support arm 30, the link member 32 may move rearward. When the link member 32 moves rearward, the link bracket 41 may move downward. As the link bracket 41 moves downward, the push protrusion 43 may push the switch 42*a* of the cylinder 42. By pushing the switch 42*a*, the cylinder 42 may be operated and may be extended to the maximum. As the cylinder 42 is extended, the support arm 30, bracket 50, and display 10 may move upward.

As described above, the first guide groove 51*d*1, the second guide groove 51*d*2, the third guide groove 51*d*3, and the fourth guide groove 51*d*4 may each be provided such that the depth thereof varies along the circumferential direction of the arc. Taking the first guide groove 51*d*1 as an example, the depth of the first guide groove 51*d*1 becomes maximum at the center. The first guide groove 51*d*1 may be provided such that the depth gradually decreases as a distance from a point (d1 in FIG. 10) where the depth is maximum increases. The first guide groove 51*d*1 may be connected to the first connection portion 51*e*1 or the fourth connection portion 51*e*4 at a point (d2 in FIG. 10) where the depth of the first guide groove 51*d*1 is minimum.

The display 10 may be positioned from the first orientation to the second orientation by being rotated at the angle of about 90 degrees with respect to the support arm 30. Likewise, the display 10 may be positioned from the second orientation to the first orientation by being rotated at the angle of about 90 degrees with respect to the support arm 30. The link member 32 may be provided to move from the front position d1 to the rear position d2 and from the rear position d2 to the front position d1 while the display 10 is rotated at the angle of about 90 degrees.

According to one embodiment, the link member 32 may be provided to move from the front position d1 to the rear position d2 based on the display being rotated at the angle of about 45 degrees. The cylinder 42 may be provided to be operated when the link member 32 moves from the front position d1 to the rear position d2. As described above, when the cylinder 42 is operated, the display 10 may automatically ascend.

Referring to FIG. 13, as the display 10 is rotated at a predetermined angle, for example, the angle of about 45 degrees, the link member 32 may move rearward. As the display 10 is rotated at the predetermined angle, the link member 32 may move rearward from the front position d1 to the rear position d2.

When the link member 32 is positioned at the rear position d2, the elastic member 33 may be compressed to the maximum. When the link member 32 is positioned at the rear position d2, at least a portion of the first guide part 32*b* may be inserted into the second guide part 41*a*. When the link member 32 is positioned at the rear position d2, the first guide part 32*b* may be maximally inserted into the second guide part 41*a*.

When the link member 32 moves rearward, the first guide part 32*b* may be inserted into the second guide part 41*a*. When the first guide part 32*b* is inserted into the second guide part 41*a*, the lower surface 32*c* of the first guide part 32*b* and the guide surface 41*b* of the second guide part 41*a* may slide by coming into contact with each other. As the lower surface 32*c* of the first guide part 32*b* slides along the guide surface 41*b*, the link bracket 41 may move downward. Because the lower surface 32*c* of the first guide part 32*b* and the guide surface 41*b* are each provided to be inclined upward toward the rear, when the lower surface 32*c* moves rearward while being in contact with the guide surface 41*b*, the guide surface 41*b* moves downward. Through this process, the link bracket 41 may move downward.

The link bracket 41 may be positioned at a first position when the link member 32 is positioned at the front position d1. The link bracket 41 may be positioned at a second position lower than the first position when the link member 32 is positioned at the rear position d2. The link bracket 41 may descend from the first position to the second position as the link member 32 moves from the front position d1 to the rear position d2. The link bracket 41 may ascend from the second position to the first position as the link member 32 moves from the rear position d2 to the front position d1.

Referring to FIG. 14, as the link bracket 41 moves downward, the push protrusion 43 moving downward together with the link bracket 41 may push the switch 42*a* of the cylinder 42. When switch 42*a* is pushed, the cylinder 42 is operated so that the cylinder 42 may be maximally extended. When the cylinder 42 is extended in the up-down direction, the link bracket 41 moves upward together with the cylinder 42, and the support arm 30 and the display 10 move upward.

Figure 15:
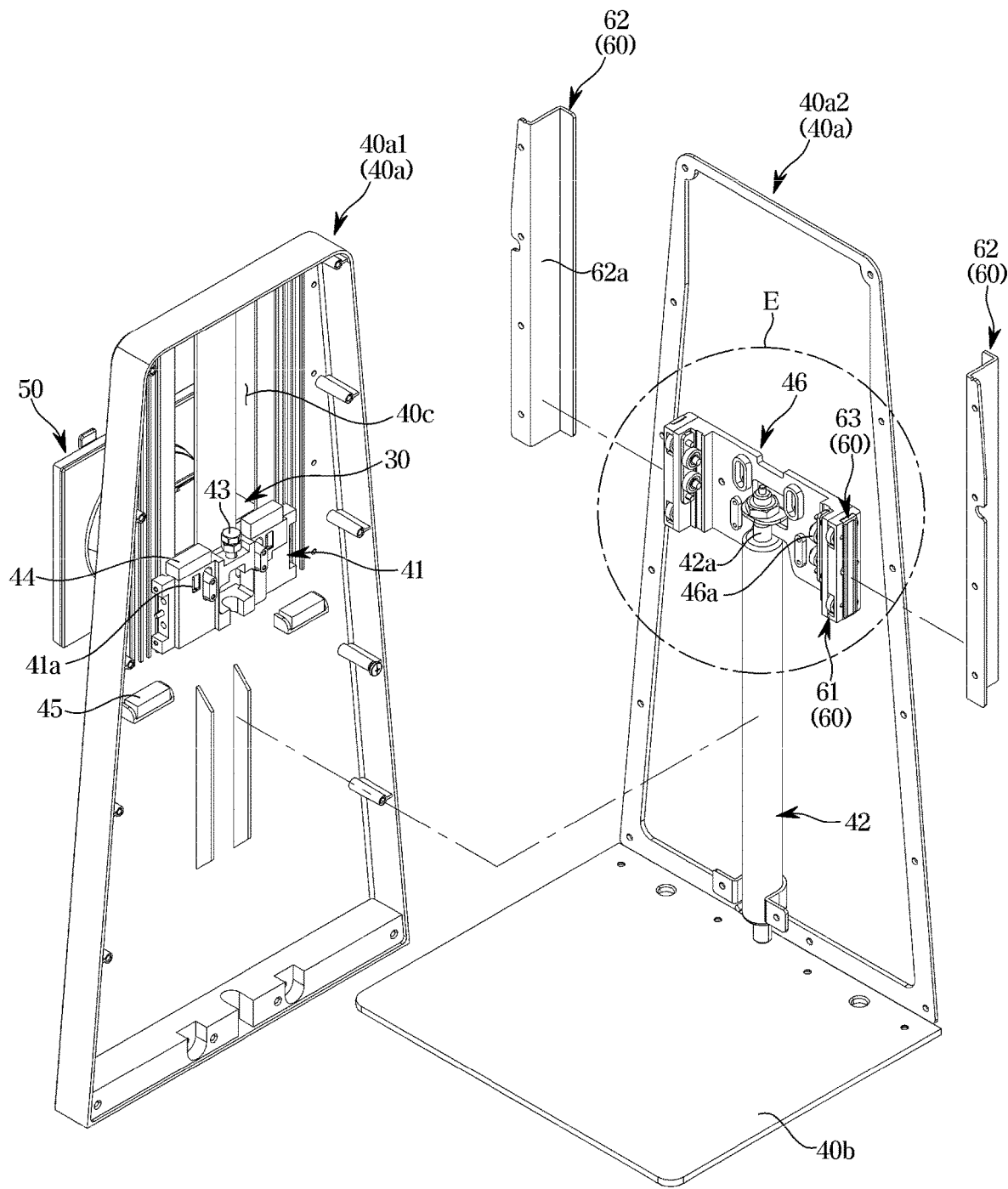
FIG. 15 is an exploded view of the support stand in the display apparatus according to an embodiment of the disclosure.
Figure 16:
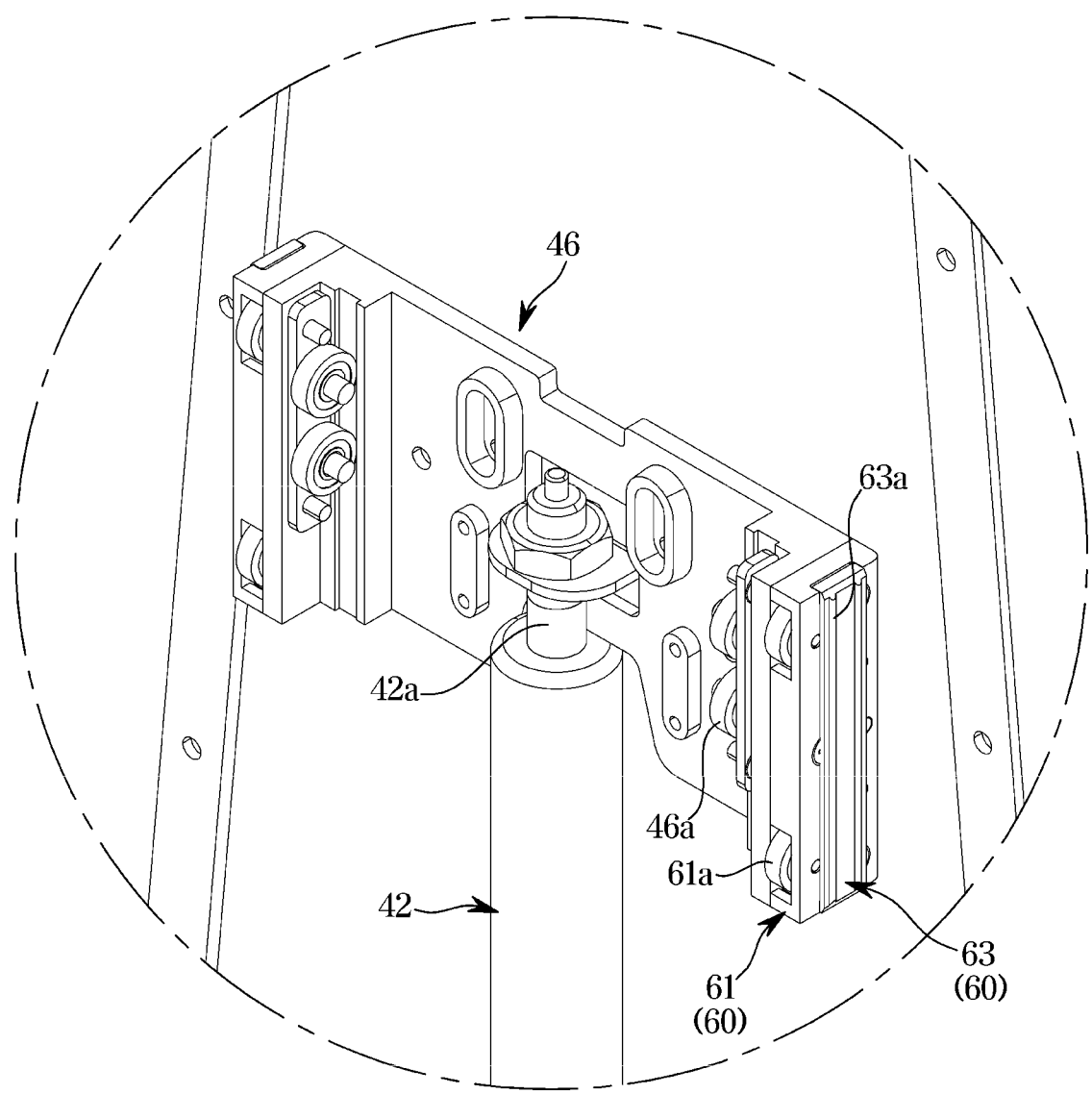
FIG. 16 is an enlarged view of part E in FIG. 15.

FIG. 15 is an exploded view of the support stand in the display apparatus according to an embodiment. FIG. 16 is an enlarged view of part E in FIG. 15.

Referring to FIGS. 15 and 16, the support stand 40 may include a lifting member 46 provided to move upward or downward together with the link bracket 41, and a damping device 60 provided to reduce a moving speed of the support arm 30 and the link bracket 41 by reducing a moving speed of the lifting member 46.

According to one embodiment, the damping device 60 may be provided to reduce an upward moving speed of the lifting member 46. The damping device 60 may be provided to reduce a downward moving speed of the lifting member 46. That is, the damping device 60 may be provided to reduce the upward and downward moving speeds of the lifting member 46, respectively.

The support stand 40 may include a first stand 40a1 forming a front part of the stand 40a and a second stand 40a2 forming a rear part of the stand 40a. The link bracket 41, the cylinder 42, and the lifting member 46 may be disposed inside the stand 40a and may be provided to be movable in the up-down direction within a predetermined range.

The support stand 40 may include a first buffer member 44 provided to reduce an impact due to collision of the link bracket 41 and the lifting member 46 with the stand 40a when the link bracket 41 and the lifting member 46 move to the uppermost end of the support stand 40.

The support stand 40 may include a second buffer member 45 provided to reduce an impact due to collision of the link bracket 41 and the lifting member 46 with the stand 40a when the link bracket 41 and the lifting member 46 move to the lowermost end of the support stand 40.

The lifting member 46 may include a lifting member roller 46a. The lifting member roller 46a may reduce a frictional force between the stand 40a and the lifting member 46 when the lifting member 46 moves upward and downward.

According to one embodiment, the damping device 60 may include a moving member 61 provided to move upward or downward together with the link bracket 41 by being coupled to the lifting member 46, a guide rail 62 provided to guide the upward and downward movements of the moving member 61, and a friction member 63 provided between the moving member 61 and the guide rail 62 to increase a frictional force of the moving member 61 against the guide rail 62.

The moving member 61 may include a moving member roller 61a. The moving member roller 61a may reduce a frictional force between the stand 40a and the moving member 61 when the moving member 61 moves upward and downward.

The guide rail 62 may include a friction surface 62a provided to be in contact with the friction member 63. The friction member 63 may include a contact rib 63a provided to be in contact with the friction surface 62a. The friction member 63 may be coupled to the moving member 61 to move together with the moving member 61.

The friction member 63 not only may reduce the upward and downward moving speeds of the lifting member 46 and the link bracket 41, but also may smooth upward and downward movements of the lifting member 46 and the link bracket 41. The damping device 60 may prevent the support arm 30 and the display 10 from rapidly ascending and descending, and provide smooth ascending and descending of support arm 30 and display 10.

Figure 17:
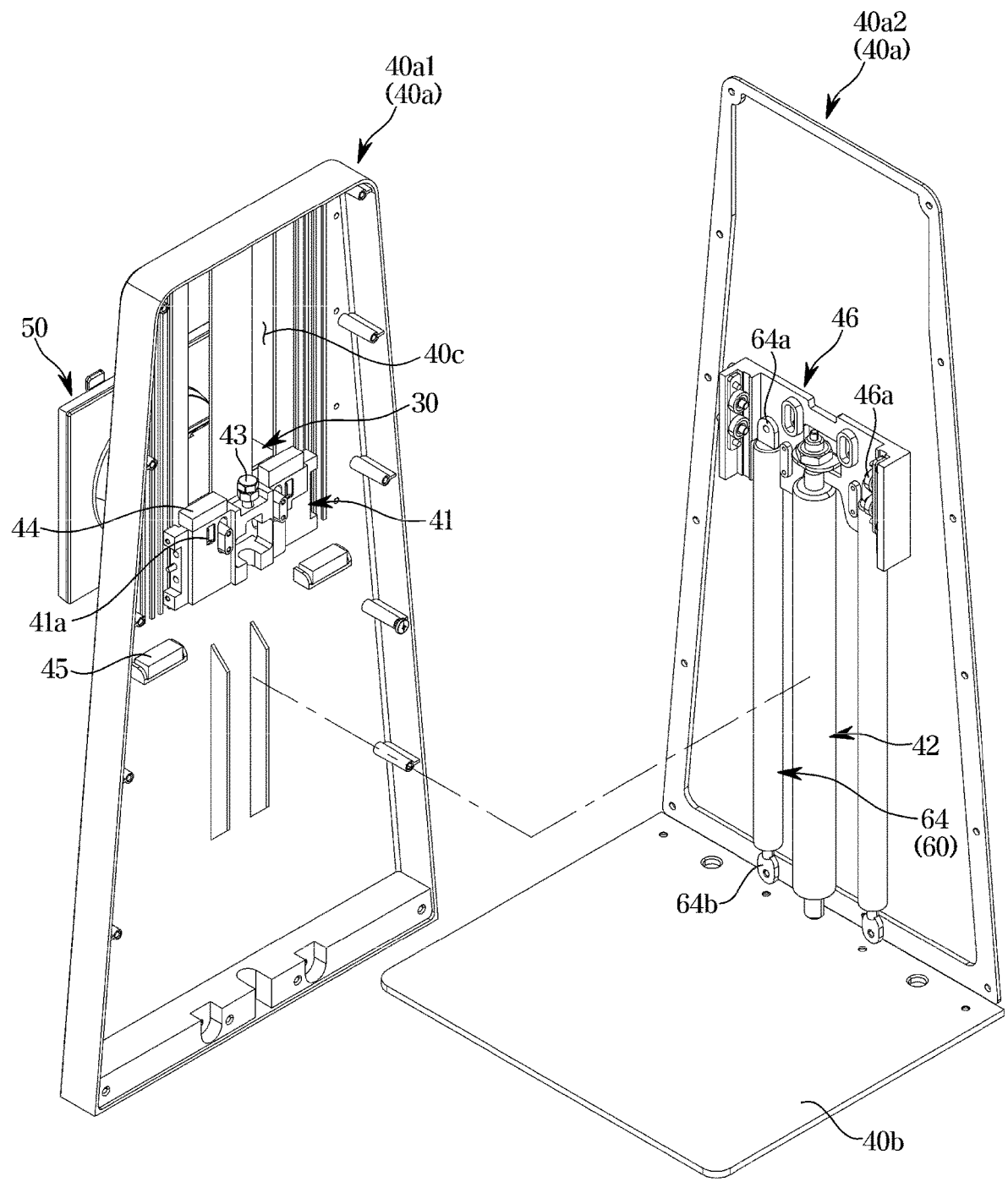
FIG. 17 is an exploded view of the support stand in the display apparatus according to an embodiment of the disclosure.

FIG. 17 is an exploded view of the support stand in the display apparatus according to an embodiment.

According to one embodiment, the damping device 60 may include a damper 64. The damper 64 may be provided to reduce a downward moving speed of the support arm 30 and the display 10. The damper 64 may be provided to assist an upward movement of the support arm 30 and the display 10.

Referring to FIG. 17, an upper end 64a of the damper 64 may be fixed to the lifting member 46. A lower end 64b of the damper 64 may be fixed to a lower end of the stand 40a or the base 40b. The damper 64 may reduce the moving speed of the lifting member 46 when the lifting member 46 moves downward. Through this, the support arm 30 and the display 10 may be prevented from descending rapidly. The damper 64 may assist the upward movement of the lifting member 46 when the lifting member 46 moves upward. That is, when the driving force of the cylinder 42 is somewhat weak, the damper 64 may assist the cylinder 42 to move the support arm 30 and the display 10 upward.

The display apparatus 1 according to an embodiment includes the display 10, the support arm 30 provided at the rear of the display to support the display and including the link member 32 provided to move forward or rearward based on the display being rotated with respect to the support arm, and the support stand 40 including the cylinder 42 provided to provide a driving force such that the support arm moves upward, and provided to support the support arm such that the support arm is movable along the vertical direction. The support stand is provided to move the display and the support arm upward by operating the cylinder based on the rearward movement of the link member.

The display may be coupled to be rotatable with respect to the support arm to be able to be positioned in any one of the first orientation in which the long side 11 of the display is disposed horizontally and the second orientation in which the long side 11 is disposed vertically.

The display may be rotatable with respect to the support arm in the first direction or the second direction opposite to the first direction to be positioned from the first orientation to the second orientation.

The display may be rotatable with respect to the support arm in the first direction or the second direction to be positioned from the second orientation to the first orientation.

The display may be provided to be positioned from the first orientation to the second orientation or from the second orientation to the first orientation by being rotated in the first direction or the second direction at a first angle with respect to the support arm.

The support stand may be provided to move the display and the support arm upward based on the display being rotated in the first direction or the second direction at a second angle that is smaller than the first angle with respect to the support arm.

The display may include the guide grooves 51d1, 51d2, 51d3, and 51d4 provided on the rear surface of the display and extending in an arc shape.

The guide groove may be provided such that the depth of the guide groove varies along the circumferential direction of the arc.

The support arm may further include the elastic member 33 provided to elastically bias the link member forward so that the link member is inserted into the guide grooves.

The support stand may further include the link bracket 41 provided to move upward or downward based on the forward or rearward movement of the link member.

The cylinder may include the switch 42a provided to operate the cylinder by being pushed.

The link bracket may be provided to push the switch by moving downward.

The link bracket may be provided to move from the first position to the second position lower than the first position based on the rearward movement of the link member.

The link bracket may be provided to move from the second position to the first position based on the forward movement of the link member moved rearward.

The link member may include the first guide part 32b provided to be connected to the link bracket.

The lower surface 32c of the first guide part may be provided to be inclined upward toward the rear.

The link bracket may include the second guide part 41a having the guide surface 41b provided to be inclined upward toward the rear to correspond to the lower surface of the first guide part.

As the link member moves rearward, at least a portion of the first guide part may be inserted into the second guide part.

As the link member moves forward, at least a portion of the first guide part may be withdrawn from the second guide part.

The support stand may further include the damping device 60 provided to reduce an upward or downward moving speed of the support arm and the link bracket.

the damping device 60 may include the moving member 61 provided to move upward or downward together with the link bracket, the guide rail 62 provided to guide the upward and downward movements of the moving member 61, and the friction member 63 provided between the moving member and the guide rail to increase the frictional force of the moving member against the guide rail.

The damping device the damper 64 provided to reduce the downward moving speed of the support arm and the link bracket.

The damper may be provided to assist the upward movement of the support arm and the link bracket.

The display apparatus 1 according to an embodiment includes the display 10 having the long side 11 and the short side 12, the support arm 30 provided at the rear of the display to rotatably support the display such that the display is positioned in the first orientation in which the long side is disposed horizontally or in the second orientation rotated by a first angle from the first orientation so that the long side is disposed vertically, and the cylinder 42 provided to provide a driving force such that the support arm moves upward, and includes the support stand 40 provided to support the support arm such that the support arm is movable along the vertical direction. The support arm includes the link member 32 provided to move forward or rearward based on the display being rotated to a second angle smaller than the first angle with respect to the support arm. The support stand is provided to move the display and the support arm upward by operating the cylinder based on the rearward movement of the link member.

The support stand may further include a link bracket 41 provided to move upward or downward based on the forward or rearward movement of the link member.

The link bracket may be provided to push the switch 42a of the cylinder by moving downward.

The link member may include the first guide part 32b having the lower surface 32c provided to be inclined upward toward the rear.

The link bracket may include the second guide part 41a having the guide surface 41b provided to be inclined upward toward the rear to correspond to the lower surface of the first guide part.

The display may include the guide grooves 51d1, 51d2, 51d3, and 51d4 provided on the rear surface of the display and extending in an arc shape.

The guide groove may be provided such that the depth of the guide groove varies along the circumferential direction of the arc.

The support arm may further include the elastic member 33 provided to elastically bias the link member forward so that the link member is inserted into the guide groove.

According to the present disclosure, a display apparatus capable of preventing a display from colliding with a floor surface during performing pivot rotation of the display can be provided.

According to the present disclosure, a display apparatus in which a support device automatically moves a display upward when pivot rotation of the display is performed at a predetermined angle can be provided.

The foregoing has illustrated and described specific embodiments. However, it should be understood by those of skilled in the art that the present disclosure is not limited to the above-described embodiments, and various changes and modifications may be made without departing from the technical idea of the present disclosure described in the following claims.

The invention claimed is:

1. A display apparatus comprising:
a display;
a support arm coupled to a rear of the display to support the display such that the display is rotatable with respect to the support arm, and including a link member configured to move forward and rearward based on the display being rotated with respect to the support arm; and
a support stand configured to support the support arm such that the support arm is movable along a vertical direction, and including a cylinder operable to provide a driving force to move the support arm upward along the vertical direction,
wherein, when the display is rotated with respect to the support arm so that the link member moves rearward, the cylinder is thereby operated to provide the driving force to move the support arm upward along the vertical direction so that the display moves upward along the vertical direction.

2. The display apparatus according to claim 1, wherein the display is rotatable with respect to the support arm so as to be positioned in any one of a first orientation in which a long side of the display is disposed horizontally and a second orientation in which the long side is disposed vertically.

3. The display apparatus according to claim 2, wherein the display is rotatable with respect to the support arm in a first direction, and a second direction opposite to the first direction, to be rotated from the first orientation to the second orientation, and from the second orientation to the first orientation.

4. The display apparatus according to claim 3, wherein the display is rotatable from the first orientation to the second orientation by being rotated in the first direction or the second direction at a first angle with respect to the support arm,
the display is rotatable from the second orientation to the first orientation by being rotated in the first direction or the second direction at the first angle with respect to the support arm, and
the support stand is configured so that the cylinder is operable to move the support arm upward along the vertical direction, and thereby move the display upward along the vertical direction, based on the display being rotated in the first direction or the second direction at a second angle with respect to the support arm, the second angle being smaller than the first angle.

5. The display apparatus according to claim 1, wherein
the display includes a plurality of guide grooves on a rear surface of the display, each guide groove among the plurality of guide grooves extending longitudinally in an arc shape, and
a depth of each guide groove among the plurality of guide grooves varies along a circumferential direction of the arc shape.

6. The display apparatus according to claim 5, wherein
the support arm includes an elastic member elastically biasing the link member forward so that the link member is insertable into a corresponding guide groove among the plurality of guide grooves.

7. The display apparatus according to claim 1, wherein
the support stand includes a link bracket configured to:
move upward along the vertical direction based on forward movement of the link member, and
move downward along the vertical direction based on rearward movement of the link member.

8. The display apparatus according to claim 7, wherein
the cylinder includes a switch to operate the cylinder to provide the driving force by being pushed, and
the link bracket pushes the switch by moving downward.

9. The display apparatus according to claim 7, wherein
the link bracket is configured to move from a first position to a second position lower than the first position based on the rearward movement of the link member, and
the link bracket is configured to move from the second position to the first position based on the forward movement of the link member.

10. The display apparatus according to claim 7, wherein
the link member includes a first guide part configured to be connected to the link bracket, and
a lower surface of the first guide part is inclined upward and rearward.

11. The display apparatus according to claim 10, wherein
the link bracket includes a second guide part having a guide surface provided to be inclined upward and rearward to correspond to the lower surface of the first guide part.

12. The display apparatus according to claim 11, wherein
as the link member moves rearward, at least a portion of the first guide part is inserted into the second guide part, and
as the link member moves forward, at least a portion of the first guide part is withdrawn from the second guide part.

13. The display apparatus according to claim 7, wherein
the support stand includes a damping device to reduce an upward and downward moving speed along the vertical direction of the support arm and the link bracket.

14. The display apparatus according to claim 13, wherein
the damping device includes:
a moving member to move upward or downward along the vertical direction together with the link bracket;
a guide rail to guide the upward and downward movements of the moving member along the vertical direction; and
a friction member between the moving member and the guide rail to increase a frictional force of the moving member against the guide rail.

* * * * *